US012634692B2

(12) United States Patent
Yang et al.

(10) Patent No.: US 12,634,692 B2
(45) Date of Patent: May 19, 2026

(54) WIRELESS COMMUNICATION METHOD, STATION DEVICE, AND ACCESS POINT DEVICE

(71) Applicant: GUANGDONG OPPO MOBILE TELECOMMUNICATIONS CORP., LTD., Dongguan (CN)

(72) Inventors: Jinyue Yang, Dongguan (CN); Chaoming Luo, Dongguan (CN); Liuming Lu, Dongguan (CN); Yawen Guo, Dongguan (CN); Honghao Ju, Dongguan (CN); Lei Huang, Singapore (SG)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 61 days.

(21) Appl. No.: 18/614,623

(22) Filed: Mar. 22, 2024

(65) Prior Publication Data

US 2024/0276218 A1     Aug. 15, 2024

Related U.S. Application Data

(63) Continuation of application No. PCT/CN2021/120433, filed on Sep. 24, 2021.

(51) Int. Cl.
*H04W 12/069*     (2021.01)
*H04W 12/033*     (2021.01)
*H04L 61/50*      (2022.01)

(52) U.S. Cl.
CPC ....... *H04W 12/069* (2021.01); *H04W 12/033* (2021.01); *H04L 61/50* (2022.05)

(58) Field of Classification Search
CPC .. H04W 12/069; H04W 12/033; H04W 61/50
See application file for complete search history.

(56) References Cited

U.S. PATENT DOCUMENTS 10,455,584 B2 * 10/2019 Kourzanov ......... H04L 61/5092
2015/0163667 A1 * 6/2015 Ginzboorg .............. H04L 63/04
726/26

(Continued)

FOREIGN PATENT DOCUMENTS

CN     105429985 A     3/2016
CN     104079686 B     11/2017

(Continued)

OTHER PUBLICATIONS

Ericsson, "Sharing UE WLAN MAC Address Toward eNB", 3GPP TSG-RAN WG3#88 R3-151058, May 29, 2015.

(Continued)

*Primary Examiner* — Viet D Vu
(74) *Attorney, Agent, or Firm* — Ladas & Parry, LLP

(57)     ABSTRACT

A wireless communication, a station (STA) device, and an access point (AP) device are disclosed. The method includes: sending, by the STA device, a first frame by a randomized media access control MAC address that is encrypted or signed to the AP device. The first frame is configured to carry a first sequence number, the first sequence number is configured to obtain a MAC address identity recognition key of the STA device by the AP device, and the MAC address identity recognition key is configured to verify the randomized MAC address. Alternatively, the method includes: sending, by a STA device, a first message to an AP device. The first message includes a list of candidate MAC addresses encrypted by a public key of the AP device, and the list of candidate MAC addresses includes at least one randomized MAC address generated by the STA device.

18 Claims, 27 Drawing Sheets

(56)  References Cited

U.S. PATENT DOCUMENTS

| | | | |
|---|---|---|---|
| 2016/0080380 A1* | 3/2016 | Dawoud Shenouda Dawoud | ...... H04L 9/3265 713/156 |
| 2016/0135053 A1* | 5/2016 | Lee | ...... H04W 12/02 726/7 |
| 2016/0269359 A1 | 9/2016 | Adrangi et al. | |
| 2018/0077742 A1* | 3/2018 | Pang | ...... H04W 74/085 |
| 2020/0127829 A1* | 4/2020 | Hsiao | ...... H04W 12/041 |
| 2021/0329462 A1 | 10/2021 | Bernsen et al. | |
| 2021/0367872 A1* | 11/2021 | Huang | ...... H04W 48/16 |

FOREIGN PATENT DOCUMENTS

| | | | |
|---|---|---|---|
| CN | 107079006 | B | 7/2020 |
| CN | 111954283 | A | 11/2020 |
| CN | 107210965 | B | 12/2020 |
| CN | 112640510 | A | 4/2021 |
| WO | 2017026930 | A1 | 2/2017 |
| WO | 2023044792 | A1 | 3/2023 |

OTHER PUBLICATIONS

International Search Report in the International Application No. PCT/CN2021/120433, mailed Jun. 29, 2022, with English translation provided by WIPO.
Written Opinion of the International Search Authority in the International Application No. PCT/CN2021/120433, mailed Jun. 29, 2022, with English machine translation provided by WIPO and partial translation by applicant's foreign counsel.

* cited by examiner

<u>100</u>

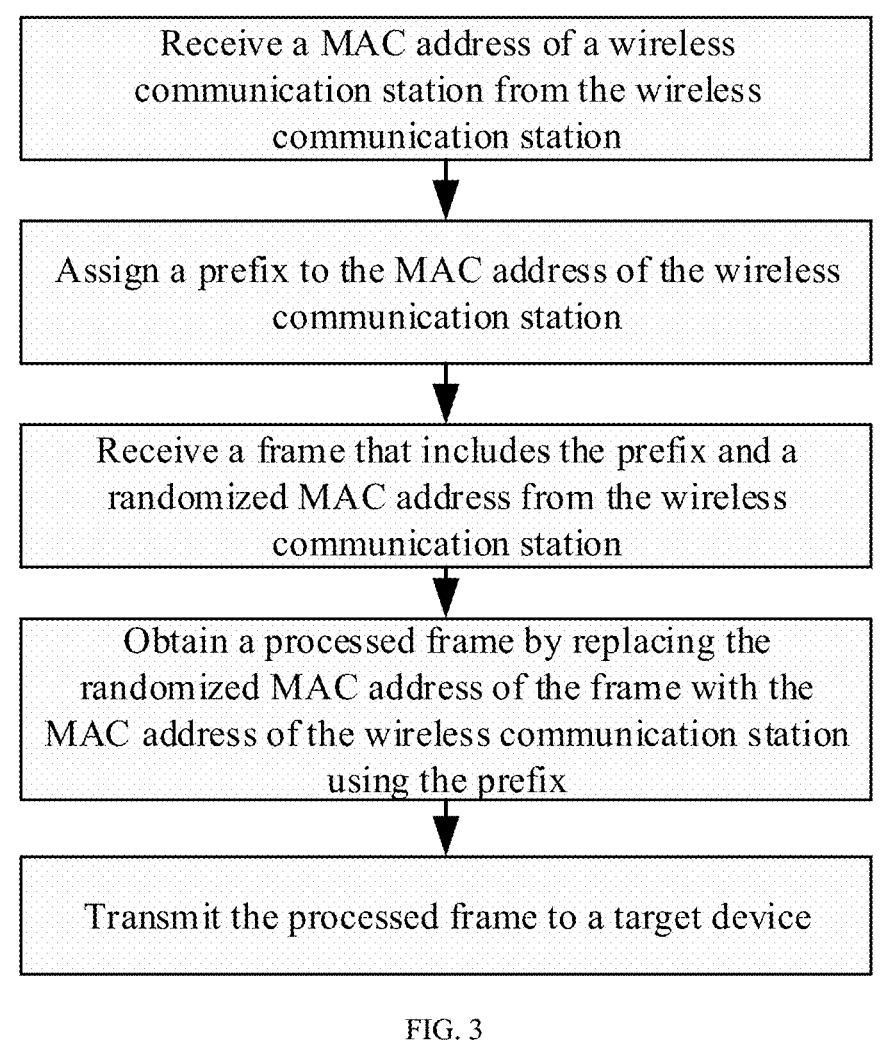

Receive a MAC address of a wireless communication station from the wireless communication station Assign a prefix to the MAC address of the wireless communication station Receive a frame that includes the prefix and a randomized MAC address from the wireless communication station Obtain a processed frame by replacing the randomized MAC address of the frame with the MAC address of the wireless communication station using the prefix Transmit the processed frame to a target device

FIG. 3

Figure 4:
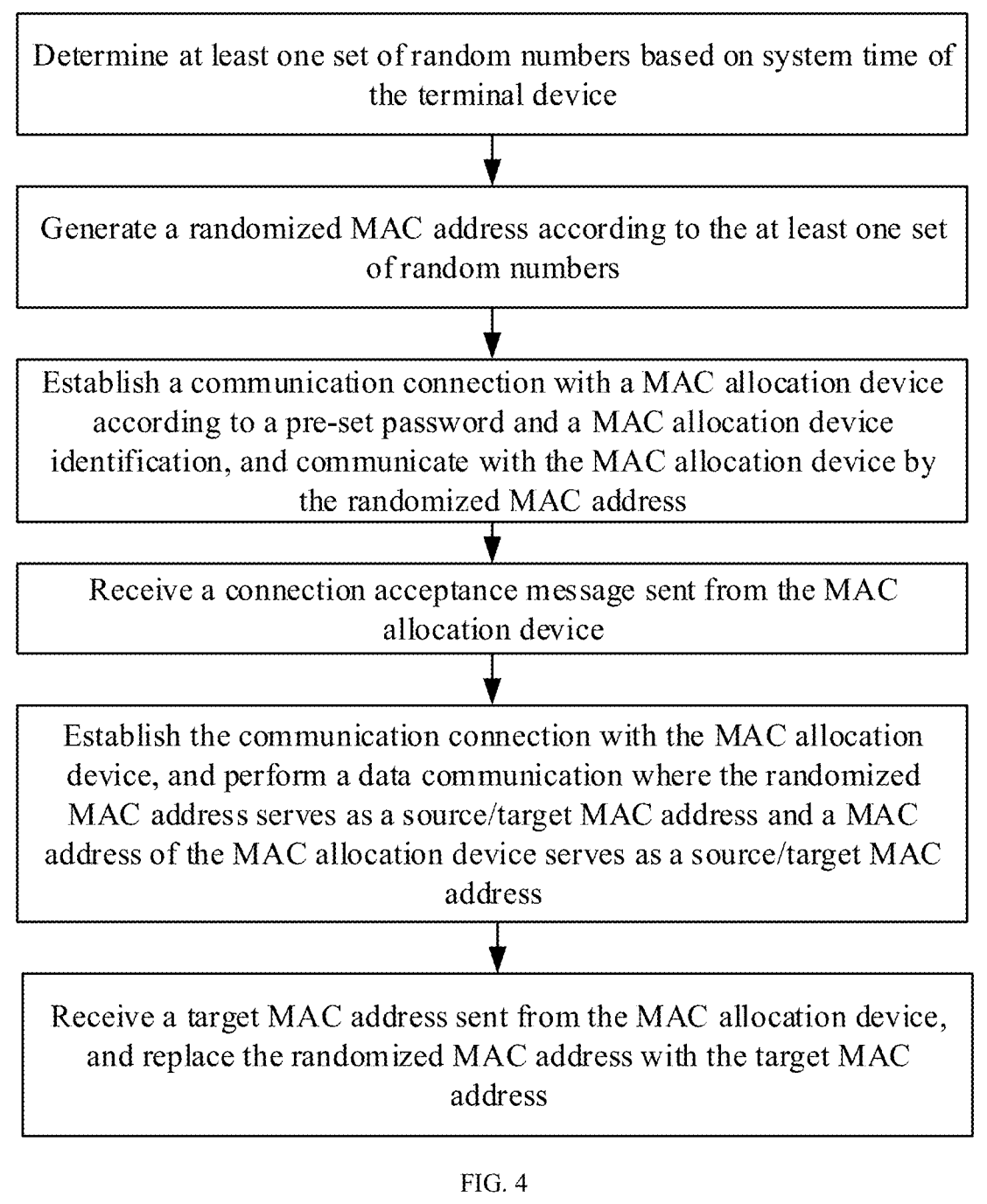

Determine at least one set of random numbers based on system time of the terminal device

↓

Generate a randomized MAC address according to the at least one set of random numbers

↓

Establish a communication connection with a MAC allocation device according to a pre-set password and a MAC allocation device identification, and communicate with the MAC allocation device by the randomized MAC address

↓

Receive a connection acceptance message sent from the MAC allocation device

↓

Establish the communication connection with the MAC allocation device, and perform a data communication where the randomized MAC address serves as a source/target MAC address and a MAC address of the MAC allocation device serves as a source/target MAC address

↓

Receive a target MAC address sent from the MAC allocation device, and replace the randomized MAC address with the target MAC address

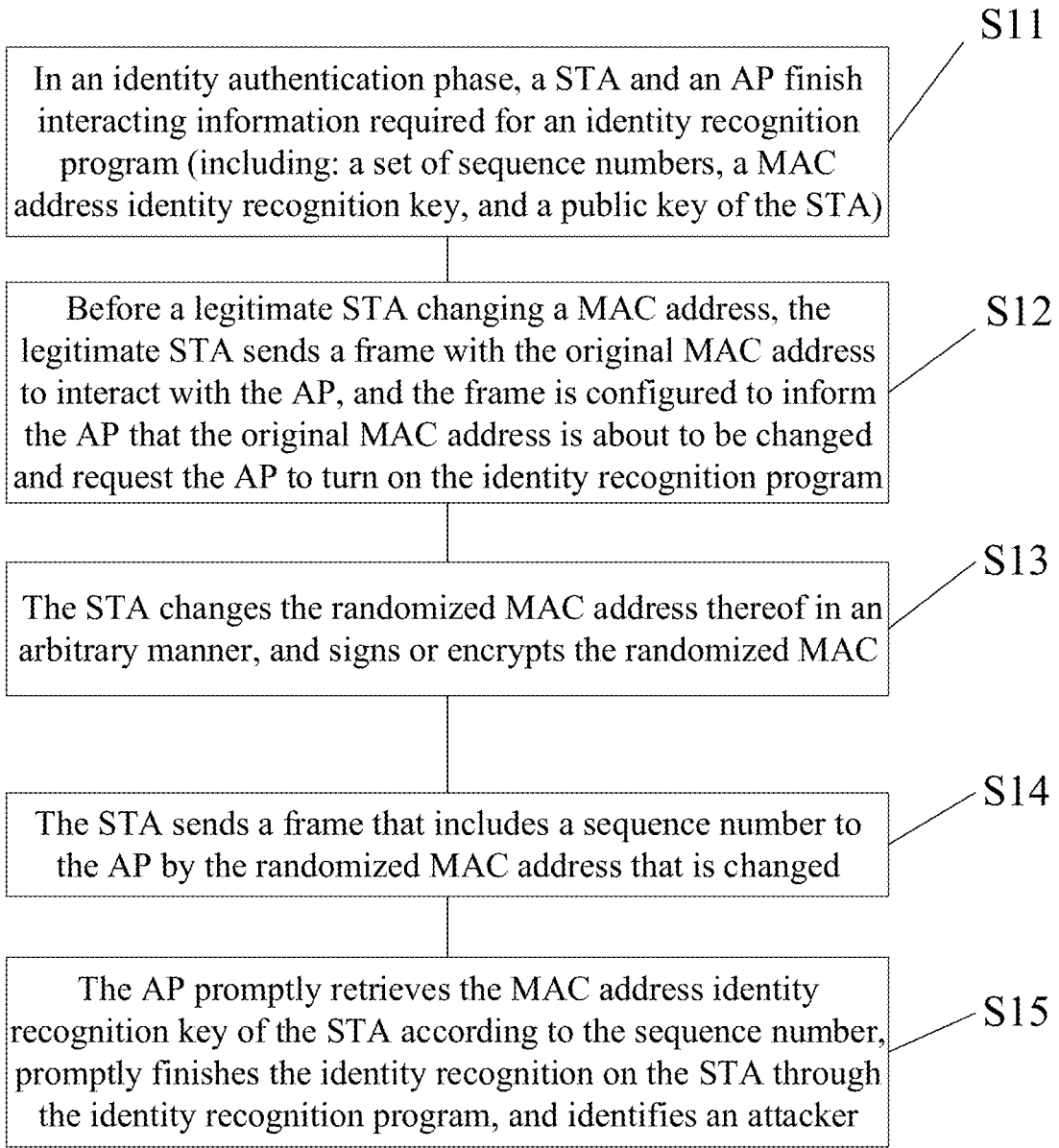

In an identity authentication phase, a STA and an AP finish interacting information required for an identity recognition program (including: a set of sequence numbers, a MAC address identity recognition key, and a public key of the STA)    S11

Before a legitimate STA changing a MAC address, the legitimate STA sends a frame with the original MAC address to interact with the AP, and the frame is configured to inform the AP that the original MAC address is about to be changed and request the AP to turn on the identity recognition program    S12

The STA changes the randomized MAC address thereof in an arbitrary manner, and signs or encrypts the randomized MAC    S13

The STA sends a frame that includes a sequence number to the AP by the randomized MAC address that is changed    S14

The AP promptly retrieves the MAC address identity recognition key of the STA according to the sequence number, promptly finishes the identity recognition on the STA through the identity recognition program, and identifies an attacker    S15

FIG. 18

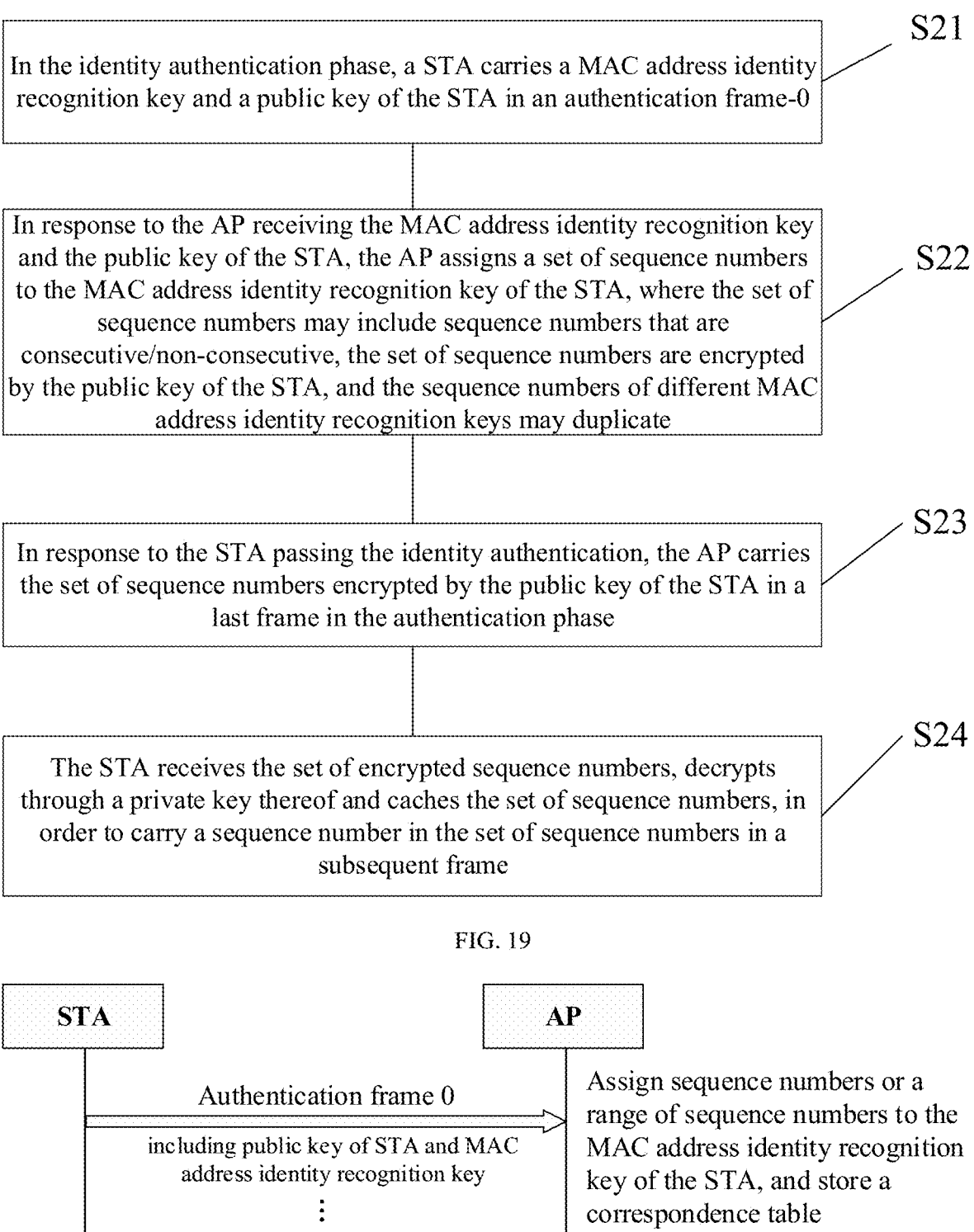

In the identity authentication phase, a STA carries a MAC address identity recognition key and a public key of the STA in an authentication frame-0 — S21

In response to the AP receiving the MAC address identity recognition key and the public key of the STA, the AP assigns a set of sequence numbers to the MAC address identity recognition key of the STA, where the set of sequence numbers may include sequence numbers that are consecutive/non-consecutive, the set of sequence numbers are encrypted by the public key of the STA, and the sequence numbers of different MAC address identity recognition keys may duplicate — S22

In response to the STA passing the identity authentication, the AP carries the set of sequence numbers encrypted by the public key of the STA in a last frame in the authentication phase — S23

The STA receives the set of encrypted sequence numbers, decrypts through a private key thereof and caches the set of sequence numbers, in order to carry a sequence number in the set of sequence numbers in a subsequent frame — S24

FIG. 19

STA     AP

Authentication frame 0 including public key of STA and MAC address identity recognition key

⋮

Authentication frame 1/3 including key sequence list

Assign sequence numbers or a range of sequence numbers to the MAC address identity recognition key of the STA, and store a correspondence table
e.g. key 1: sequence number 1, sequence number 2, sequence number 3···

FIG. 20

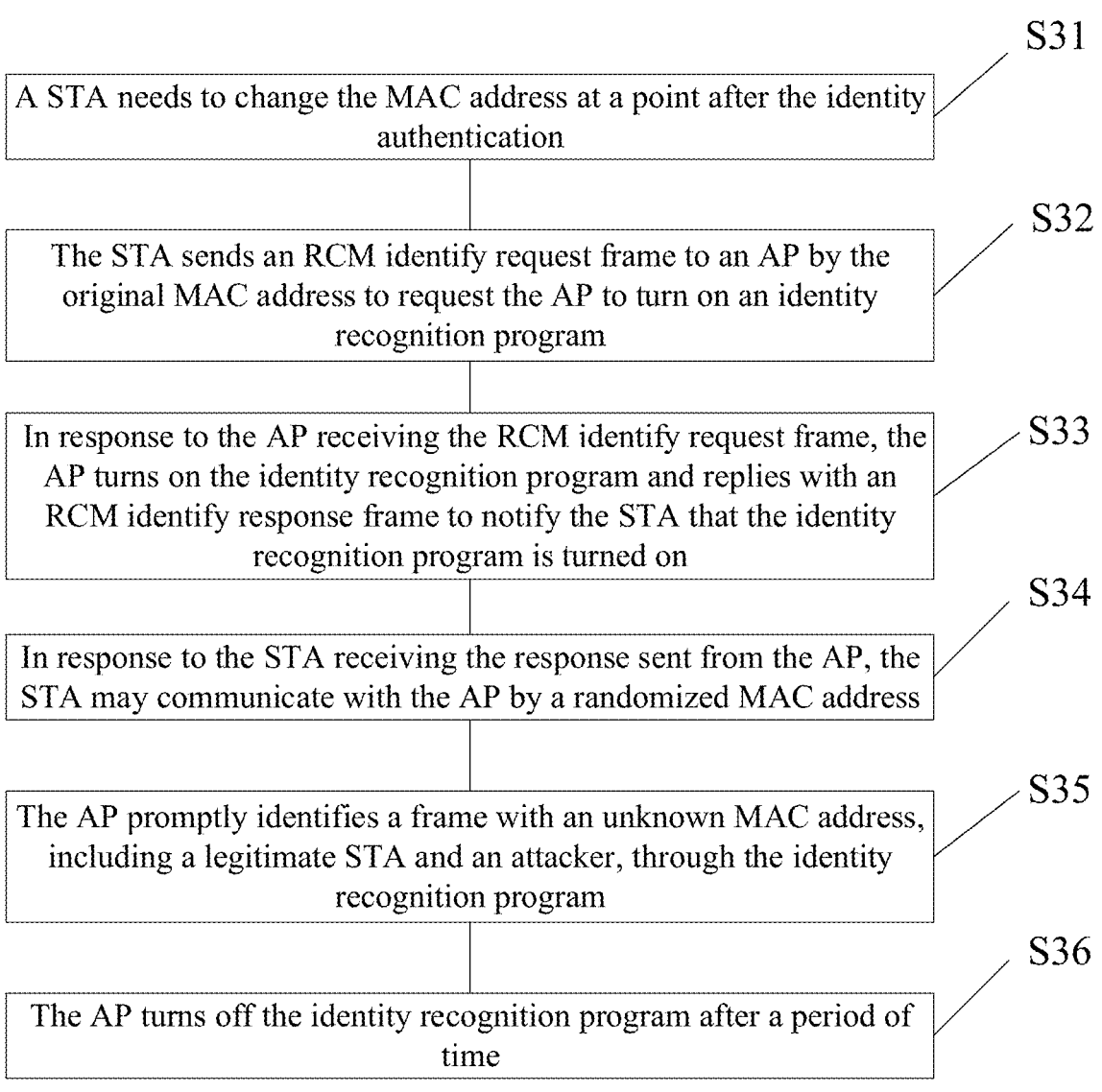

S31

A STA needs to change the MAC address at a point after the identity authentication

S32

The STA sends an RCM identify request frame to an AP by the original MAC address to request the AP to turn on an identity recognition program

S33

In response to the AP receiving the RCM identify request frame, the AP turns on the identity recognition program and replies with an RCM identify response frame to notify the STA that the identity recognition program is turned on

S34

In response to the STA receiving the response sent from the AP, the STA may communicate with the AP by a randomized MAC address

S35

The AP promptly identifies a frame with an unknown MAC address, including a legitimate STA and an attacker, through the identity recognition program

S36

The AP turns off the identity recognition program after a period of time

FIG. 21

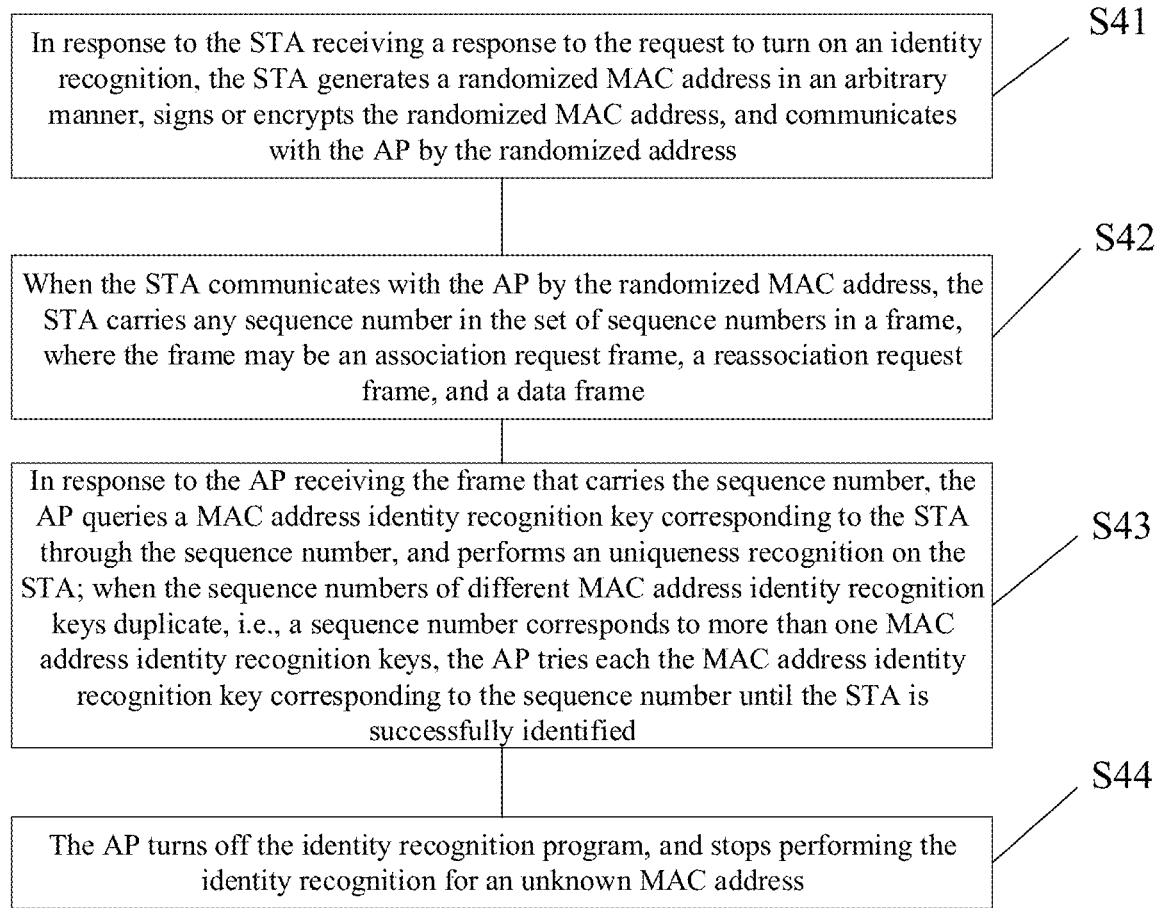

In response to the STA receiving a response to the request to turn on an identity recognition, the STA generates a randomized MAC address in an arbitrary manner, signs or encrypts the randomized MAC address, and communicates with the AP by the randomized address

S41

When the STA communicates with the AP by the randomized MAC address, the STA carries any sequence number in the set of sequence numbers in a frame, where the frame may be an association request frame, a reassociation request frame, and a data frame

S42

In response to the AP receiving the frame that carries the sequence number, the AP queries a MAC address identity recognition key corresponding to the STA through the sequence number, and performs an uniqueness recognition on the STA; when the sequence numbers of different MAC address identity recognition keys duplicate, i.e., a sequence number corresponds to more than one MAC address identity recognition keys, the AP tries each the MAC address identity recognition key corresponding to the sequence number until the STA is successfully identified

S43

The AP turns off the identity recognition program, and stops performing the identity recognition for an unknown MAC address

S310, the STA device sends a first message to the AP device, where the first message includes a list of candidate MAC addresses encrypted by a public key of the AP device, and the list of candidate MAC addresses includes at least one randomized MAC address generated by the STA device S320, the AP device receives the first message sent from the STA device

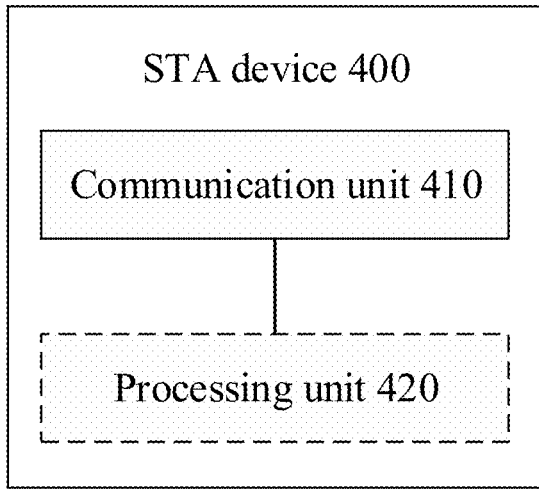
FIG. 32
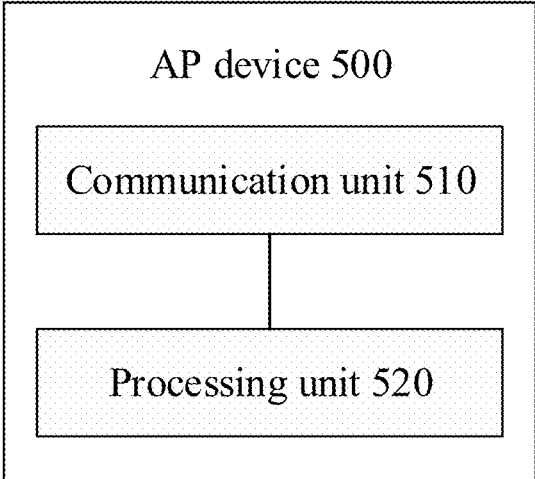
FIG. 33
STA device 600
Communication unit 610
FIG. 34

WIRELESS COMMUNICATION METHOD, STATION DEVICE, AND ACCESS POINT DEVICE

CROSS REFERENCE TO RELATED APPLICATION

The present disclosure is a continuation of International Patent Application No. PCT/CN2021/120433, the contents of which is herein incorporated by reference in its entirety.

TECHNICAL FIELD

The present disclosure relates to the field of communication, and more particularly, to a wireless communication method, a station device, and an access point device.

BACKGROUND

A station (STA) device is configured to send a frame with a media access control (MAC) address of the STA device as a self-identification to an access point (AP) device. However, since the MAC address of the device is globally unique and permanent, a network attacker may easily track a user by tracing the MAC address of the device, resulting in a large amount of the user's private information being exposed in the network. In order to solve this problem, a MAC address randomization function is introduced to protect user privacy, and to ensure that original functions of the network are operated normally, the AP device needs to perform an identity uniqueness recognition on a STA device that adopts a randomized MAC address. Specifically, when the AP is recognizing the randomized MAC address or a signature of a certain STA through a MAC address identity recognition key, the AP needs to try each the MAC address identity recognition key stored locally until a certain MAC address identity recognition key is successfully identified, or until all the MAC address identity recognition keys are tried. Such a brute force testing leads to an increased complexity and a relatively low time efficiency at a receiving end. Avoiding the brute force testing in the process of performing the identity uniqueness recognition on the STA device that adopts the randomized MAC address becomes an urgent problem to be solved.

SUMMARY OF THE DISCLOSURE

Some embodiments of the present disclosure provide a wireless communication method, a station (STA) device, and an access point (AP) device, which allows promptly performing the identity uniqueness recognition on the STA device that adopts a randomized MAC address and avoids a brute force testing.

In a first aspect, some embodiments of the present disclosure provide a wireless communication method, and the method may include the following:

sending, by a STA device, a first frame by a randomized media access control MAC address that is encrypted or signed to an AP device;

wherein the first frame is configured to carry a first sequence number; the first sequence number is configured to obtain a MAC address identity recognition key of the STA device by the AP device; and the MAC address identity recognition key is configured to verify the randomized MAC address; or sending, by a STA device, a first message to an AP device;

wherein the first message includes a list of candidate MAC addresses encrypted by a public key of the AP device, and the list of candidate MAC addresses includes at least one randomized MAC address generated by the STA device.

In a second aspect, some embodiments of the present disclosure further provide a STA device, and the STA device includes a processor and a memory. The memory is configured to store a computer program, and when the computer program stored in the memory is called and run by the processor, the processor is caused to perform a wireless communication method. The method includes: sending, by the STA device, a first frame by a randomized media access control MAC address that is encrypted or signed to an AP device. The first frame is configured to carry a first sequence number; the first sequence number is configured to obtain a MAC address identity recognition key of the STA device by the AP device; and the MAC address identity recognition key is configured to verify the randomized MAC address. Alternatively, the method includes: sending, by the STA device, a first message to an AP device. The first message includes a list of candidate MAC addresses encrypted by a public key of the AP device, and the list of candidate MAC addresses includes at least one randomized MAC address generated by the STA device.

In a third aspect, some embodiments of the present disclosure further provide an AP device, and the AP device includes a processor and a memory. The memory is configured to store a computer program, and when the computer program stored in the memory is called and run by the processor, the processor is caused to perform a wireless communication method. The method includes: receiving, by the AP device, a first frame sent from a STA device by a randomized media access control MAC address that is encrypted or signed; wherein the first frame is configured to carry a first sequence number; obtaining, by the AP device, a MAC address identity recognition key of the STA device according to the first sequence number; and verifying, by the AP device, the randomized MAC address according to the MAC address identity recognition key. Alternatively, the method includes: receiving, by an AP device, a first message sent from a STA device. The first message includes a list of candidate media access control MAC addresses encrypted by a public key of the AP device, and the list of candidate MAC addresses includes at least one randomized MAC address generated by the STA device.

BRIEF DESCRIPTION OF THE DRAWINGS

FIG. 3 is a flowchart illustrating a solution of "prefix" according to the present disclosure.

FIG. 4 is a flowchart illustrating a solution of a MAC allocation device allocating a MAC address according to the present disclosure.

FIG. 13 is a schematic diagram illustrating an authentication frame according to an embodiment of the present disclosure.

FIG. 18 is a flowchart illustrating an identity recognition process according to an embodiment of the present disclosure.

FIG. 19 is a flowchart illustrating an interaction of information required for an identity recognition program according to an embodiment of the present disclosure.

FIG. 20 is a schematic diagram illustrating a frame interaction of the interaction with information required for the identity recognition program according to an embodiment of the present disclosure.

FIG. 21 is a flowchart illustrating a request to turn on an identity recognition program according to an embodiment of the present disclosure.

FIG. 23 is a flowchart illustrating an identity recognition according to an embodiment of the present disclosure.

FIG. 32 is a structural block view of a STA device according to an embodiment of the present disclosure.

FIG. 33 is a structural block view of an AP device according to an embodiment of the present disclosure.

FIG. 34 is a structural block view of another STA device according to an embodiment of the present disclosure.

DETAILED DESCRIPTION

The technical solutions provided in the embodiments of the present disclosure will be described below in conjunction with the drawings in the embodiments of the present disclosure, and apparently, the described embodiments are some of, rather than all of, the embodiments of the present disclosure. With respect to the embodiments of the present disclosure, all other embodiments that can be obtained by an ordinary skilled in the art without creative work fall within the scope of protection of the present disclosure.

The technical solutions provided in the embodiments of the present disclosure may be applied to various communication systems, for example, wireless local area networks (WLAN), wireless fidelity (WiFi), or other communication systems.

Figure 1:
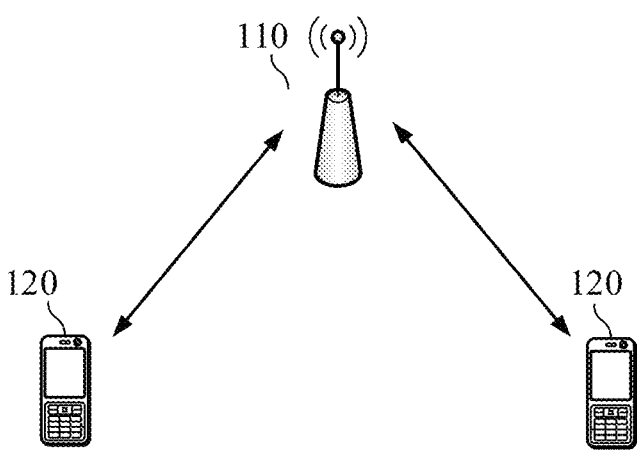
FIG. 1 is a schematic diagram illustrating a communication system architecture applied by an embodiment of the present disclosure.

FIG. 1 is a schematic diagram illustrating a communication system 100 applied by an embodiment of the present disclosure. The communication system 100 may include an AP 110, and an STA 120 accessing the network through the AP 110.

In some embodiments, the AP may be referred to as an AP STA, that is, the AP is further an STA to some extent. In some embodiments, the STA may be referred to as a non-AP STA.

In some embodiments, the STA may include the AP STA and the non-AP STA.

A Communication within the communication system 100 may be between the AP and the STA, between the STA and the STA, or between the STA and a peer STA. The peer STA may refer to a device that communicates with the STA on another end, for example, the peer STA may be the AP or the non-AP STA.

The AP is equivalent to a bridge connecting a wired network and a wireless network. A main function of the AP is to connect each wireless network client together, and then connect the wireless network to the Ethernet. The AP device may be an end device (e.g., a cell phone) or a network device (e.g., a router), which includes a WiFi chip.

The role of the STA in the communication system is not absolute. For example, in some embodiments, the cell phone is the STA when the cell phone is connected to a route, and the cell phone is the AP when the cell phone serves as a hotspot for other cell phones.

The AP and the STA may be a device applied in the internet of vehicles (IoV), an internet of things (IoT) node, a sensor, etc. in an IoT, a smart camera, a smart remote, a smart water meter and electricity meter, etc. in a smart home, and a sensor in a smart city.

In some embodiments, the STA may support an 802.11be standard. In addition, the STA may support a variety of current and future WLAN standards that belong to an 802.11 family, for example, an 802.11ax, an 802.11ac, an 802.11n, an 802.11g, an 802.11b, and an 802.11a.

In some embodiments, the AP may be a device that supports the 802.11be standard. In addition, the STA may support a variety of current and future WLAN standards that belong to the 802.11 family, for example, the 802.11ax, the 802.11ac, the 802.11n, the 802.11g, the 802.11b, and the 802.11a.

In some embodiments, the AP 110 and/or the STA 120 may be deployed on land, including indoor or outdoor, handheld, wearable, or vehicle-mounted, may be deployed on water (e.g., ships), and may be deployed in the air (e.g., on an airplane, a balloon, a satellite, etc.).

In the embodiments of the present disclosure, the STA 120 may be a mobile phone that supports the WLAN/WiFi technology, a pad, a computer with a wireless transceiving function, a virtual reality (VR) device, an augmented reality (AR) device, a wireless device in an industrial control, a set-top box, a wireless device in a self-driving, an in-vehicle communication device, a wireless device in a remote medical, a wireless device in a smart grid, a wireless device in a transportation security, a wireless device in the smart city or in the smart home, an in-vehicle communication device, a wireless communication chip/application specific integrated circuit (ASIC)/system on chip (SoC), and so on.

As illustrations rather than limitations, in the embodiments of the present disclosure, the STA 120 may further be a wearable device. The wearable device may further be referred to as a wearable smart device, which is a general term for wearable devices that are intelligently designed and developed by applying the wearable technology to daily wear, such as glasses, gloves, watches, apparels, shoes, and so on. The wearable device is a portable device that is worn directly on a user's body or integrated into the user's clothing or accessories. The wearable device not only is a hardware device, but further can realize powerful functions through software support as well as data and cloud interactions. The general wearable smart device includes a full-featured, large-sized device that may realize complete or partial functionality without relying on a smartphone, for example, a smart watch or smart glasses, as well as a device that focuses on a certain type of application functionality and needs to be used along with other devices (e.g., the smartphone), for example, various types of smart bracelets and smart jewelry for monitoring vital signs.

The WLAN technology may support frequency bands, including but not limited to, a low frequency band (2.4 GHz, 5 GHz, 6 GHz) and a high frequency band (60 GHz).

FIG. 1, for example, illustrates one AP and two STAs. In some embodiments, the communication system 100 may include more than one AP and more than or less than two STAs, which are not limited by the embodiments of the present disclosure.

In the embodiments of the present disclosure, a device with communication functions in the network/system may be referred to as a communication device. Taking the communication system 100 illustrated in FIG. 1 as an example, the communication device may include the AP 110 and the STA 120, which have the communication functions, and the AP 110 and STA 120 may be specific devices as described above, which will not be repeated herein. The communication device may further include other devices in the communication system 100, such as a network controller, a gateway, and other network entities, which are not limited in the embodiments of the present disclosure.

Terms "system" and "network" are often used interchangeably herein. A term "and/or" herein merely describes an association relationship between associated objects, indicating that three kinds of relationships may exist. For example, A and/or B may be explained as: A alone, both A and B, and B alone. In addition, the character "/" herein generally indicates an "or" relationship between the associated objects.

A term "indicate" mentioned in the embodiments of the present disclosure may refer to a direct indication, an indirect indication, or an indication of an association relationship. For example, A indicates B may be explained as: A directly indicates B, e.g., B can be obtained through A; A indirectly indicates B, e.g., A indicates C and B can be obtained through C; or an association relationship between A and B.

The terms used in the embodiments of the present disclosure are only for a purpose of explaining specific embodiments of the present disclosure and are not intended to limit the present disclosure. The terms "first", "second", "third", "fourth", and etc., in the specification, claims, and the described drawings of the present disclosure are used to distinguish between different objects but not to describe a particular order. In addition, the terms "including", "having", and any variations thereof are intended to cover a non-exclusive inclusion.

In the embodiments of the present disclosure, a term "corresponding" may indicate a direct or indirect correspondence between two, or an association relationship between the two, or a relationship between instructing and being instructed, configuring and being configured, and so on.

In the embodiments of the present disclosure, terms "pre-defined" or "pre-configured" may be realized by storing a corresponding code, table, or other means for indicating relevant information ahead of time in a device (e.g., including the STA and a network device), and the specific implementation thereof is not limited by the present disclosure. For example, the term "pre-defined" may be referred to as "defined by a protocol".

In the embodiments of the present disclosure, the "protocol" may refer to a standard protocol in the field of communication, for example, a WiFi protocol and a relevant protocol to be applied in a future WiFi communication system, which is not limited by the present disclosure.

In order to facilitate the understanding of the technical solutions provided in the embodiments of the present disclosure, the technical solutions of the present disclosure are described in detail through the following specific embodiments. The relevant technologies below may be randomly combined with the technical solutions provided in the embodiments of the present disclosure as optional solutions, which all fall within the scope of protection of the embodiments of the present disclosure. The embodiments of the present disclosure include at least some of the following.

The wireless device supports a multi-band communication, e.g., simultaneously performing communications on the 2.4 GHz, the 5 GHz, the 6 GHz, and the 60 GHz band, or simultaneously performing communications on different channels in a same frequency band (or different frequency bands), to improve a throughput and/or reliability of communications between the devices. The device is often referred to as a multi-band device, a multi-link device (MLD), or sometimes a multi-link entity or a multi-band entity. The MLD may be the AP device or the STA device. When the MLD is the AP device, the MLD includes one or more APs. When the MLD is the STA device, the MLD includes one or more non-AP STAs.

A MLD that includes one or more APs is referred to as an AP MLD, a MLD that includes one or more non-AP STAs is referred to as a non-AP MLD. In the embodiments of the present disclosure, the non-AP MLD may be referred to as an STA MLD.

In the embodiments of the present disclosure, the AP MLD may include more than one AP, the non-AP MLD may include more than one STA, more than one link may be formed between the AP of the AP MLD and the STA of the non-AP MLD, and a data communication may be enabled between the AP of the AP MLD and a corresponding STA of the non-AP MLD through a corresponding link.

In order to facilitate the understanding of the technical solutions provided in the embodiments of the present disclosure, the MAC address randomization illustrated in the present disclosure is explained as follows.

In an 802.11 network, a MAC address is unique throughout the network, so a STA uses the MAC address as an identification. The STA is configured to send a frame with the MAC address of the STA device as a self-identification to an AP. However, since the MAC address of a device is globally unique and permanent, a network attacker may easily track a user by tracing the MAC address of the device, resulting in a large amount of the user's private information being exposed to the network. Therefore, regarding this issue, an operation that the STA uses a randomized and ever-changing MAC address is introduced to enhance user privacy.

Currently, the following terms are defined for the randomized and ever-changing MAC address.

(1) A randomized MAC address: a single MAC address configured to identify a MAC entity (a Layer 2 MAC entity or a physical (PHY) entity identification), instead of a permanent identifier. The randomized MAC address may be permanent or may be only used for a relatively short period, in order to hide a true identity of the device.

(2) A changing MAC address: a randomized MAC address that changes over time. A change to the MAC address may be periodic, event-driven, or triggered by other events.

(3) A rapidly changing MAC address: a type of the changing MAC address, in which the change to the MAC address happens usually within a few minutes or less. For example, changing the MAC address during the network access process.

In order to facilitate the understanding of the technical solutions provided in the embodiments of the present disclosure, a first solution regarding the MAC address randomization illustrated in the present disclosure is explained as follows.

When an STA uses a randomized MAC address to interact with an AP, the randomized MAC address causes the AP to fail to identify the STA through the MAC address, thereby affecting a network access, switching, and data exchange process of the STA. In order to address the problem of STA identification, the AP may identify a mechanism of the STA through an encryption method or a digital signature, and different types of keys may be used particularly, such as a cryptography key, a public key, a hash function, a hash seed, a hash chain version number, and etc. (which can be collectively referred to as a MAC address identity recognition key).

The principle of identifying the STA through the encryption method is that the STA is configured to send the key to the AP, and the AP is configured to store the key locally after receiving the key. The STA generates a randomized MAC using the unique key, and in response to the randomized MAC address of the STA being changed in a subsequent communication, the STA is configured to instruct the AP to identify the MAC address of the frame through the key, and the AP is configured to try each locally cached key until the randomized MAC address is decrypted successfully or all the keys are tried.

The principle of identifying the STA through the signature method is that the STA is configured to send a public key to the AP before the randomized MAC address change, and the AP stores the public key locally. In response to the randomized MAC address of the STA being changed in a subsequent communication, the STA uses a private key to digitally sign the MAC address in a frame, and after the AP receives the frame that includes a signature, the AP uses the locally stored public key to identify the MAC address of the frame.

Figure 2:
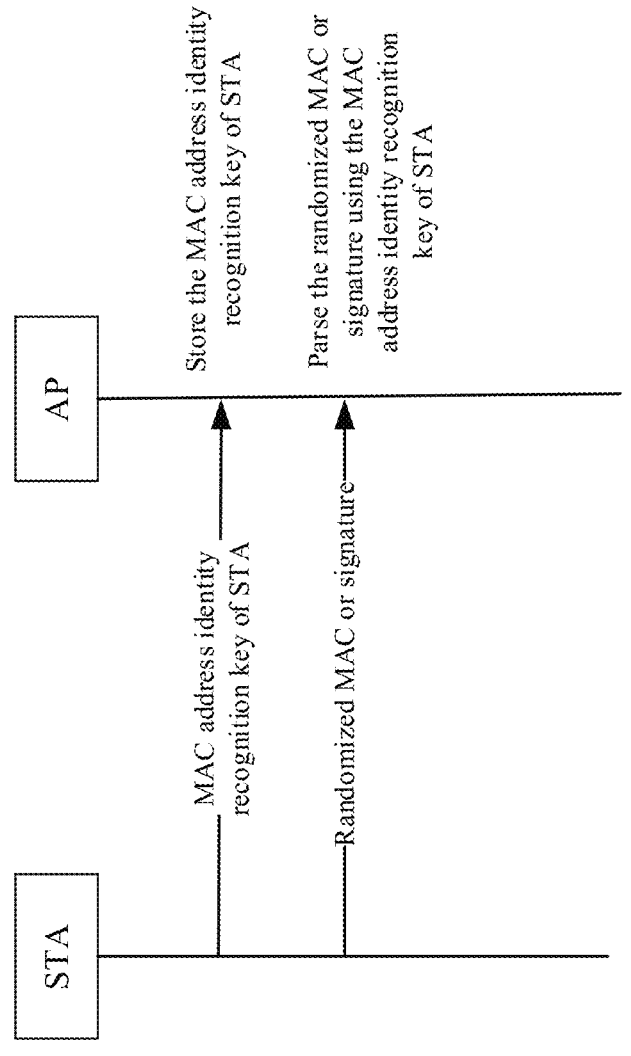
FIG. 2 is a schematic diagram illustrating an AP using a MAC address identity recognition key to identify a STA according to the present disclosure.

For convenience, the key in the signature method/encryption method may be collectively referred to as the MAC address identity recognition key, and a flowchart of identifying the randomized MAC address through the encryption method or the signature mechanism is illustrated in FIG. 2.

(1) The STA is configured to send the MAC address identity recognition key thereof to the AP, and the MAC address identity recognition key of the STA is locally cached by the AP as a basis for identifying the STA.

(2) The STA is configured to carry the randomized MAC address or signature when the STA interacts with the AP, and the AP is configured to parse each the randomized MAC address or signature of the STA using the locally cached MAC address identity recognition key until the AP successfully parses a randomized MAC address or signature of the STA and identifies the STA, or the AP tries all the locally cached MAC address identity recognition key and concludes that the STA has never interacted with the AP.

In the first solution, the AP needs to perform the identity uniqueness recognition on the STA for every data interaction, and performing the identity uniqueness recognition on the STA at the AP end is extremely complicated. The technical solutions provided by the present disclosure may greatly reduce the complexity of performing the identity uniqueness recognition on the STA at the AP end.

In order to facilitate the understanding of the technical solutions provided in the embodiments of the present disclosure, a second solution regarding the MAC address randomization illustrated in the present disclosure is explained as follows.

In the second solution, a same device is identified by means of a "prefix", and a flowchart of the second solution is specifically illustrated in FIG. 3. The AP is configured to a "prefix" to the STA to replace the MAC address of the STA, and the specific process is provided as follows.

(1) The STA is configured to a real MAC address to the AP for replacing the "prefix" with the real MAC address later.

(2) In response to the AP receiving the real MAC address of the STA, the AP is configured to one or more "prefixes" to the STA and locally generates a mapping table of the "prefixes" and the real MAC address of the STA.

(3) In response to the STA receiving the "prefixes" assigned by the AP, the STA adds a corresponding "prefix" to a frame when the STA communicates with the AP by the randomized MAC address in a subsequent communication.

(4) In response to the AP receiving the randomized MAC address and the "prefix" of the STA, the AP identifies the real MAC address of the STA according to the "prefix". In response to the AP identifying the real MAC address of the STA, the AP replaces the randomized MAC address of the STA in the frame with the real MAC address of the STA.

The second solution is mainly to assign the "prefix" by a MAC allocation device (corresponding to the AP), and the "prefix" corresponds to the MAC address. However, the technical solutions provided by the present disclosure is to assign a sequence number to the MAC address identity recognition key of the STA by the AP, in order to reducing the complexity of the identification process at the receiving end and mitigating the brute-force testing. In the second solution, the "prefix" corresponds to the MAC address so the "prefixes" corresponding to different MAC addresses may not duplicate, and the "prefix" is not encrypted, which has a relatively low security level. However, in the technical solutions provided by the present disclosure, a sequence number of the MAC address identity recognition key may duplicate, and is encrypted by the public key of the STA to enhance the security level of the STA.

In order to facilitate the understanding of the technical solutions provided in the embodiments of the present disclosure, a third solution regarding the MAC address randomization illustrated in the present disclosure is explained as follows.

In the third solution, a "MAC allocation device" is configured to allocate the MAC address to a terminal, in order to protect the real MAC address of the device, and the specific process of the third solution is illustrated in FIG. 4.

First, the terminal device generates a randomized MAC address according to system time thereof and establishes a communication connection with the MAC allocation device. In response to a connection request sent from the terminal device is successful, the "MAC allocation device" is configured to assign a MAC address to the terminal device. In response to the terminal device receiving the assigned MAC address, the terminal device replaces the randomized MAC address of the terminal device with the assigned MAC address.

The third solution is mainly to assign the MAC address by the MAC allocation device (corresponding to the AP), and all the MAC address are collectively allocated by the MAC allocation device. However, the technical solutions provided by the present disclosure allow the STA to generate the randomized MAC address locally at will. Besides, the sequence number in the technical solutions provided by the present disclosure corresponds to the MAC address identity recognition key at the AP end instead of the MAC address.

Figure 5:
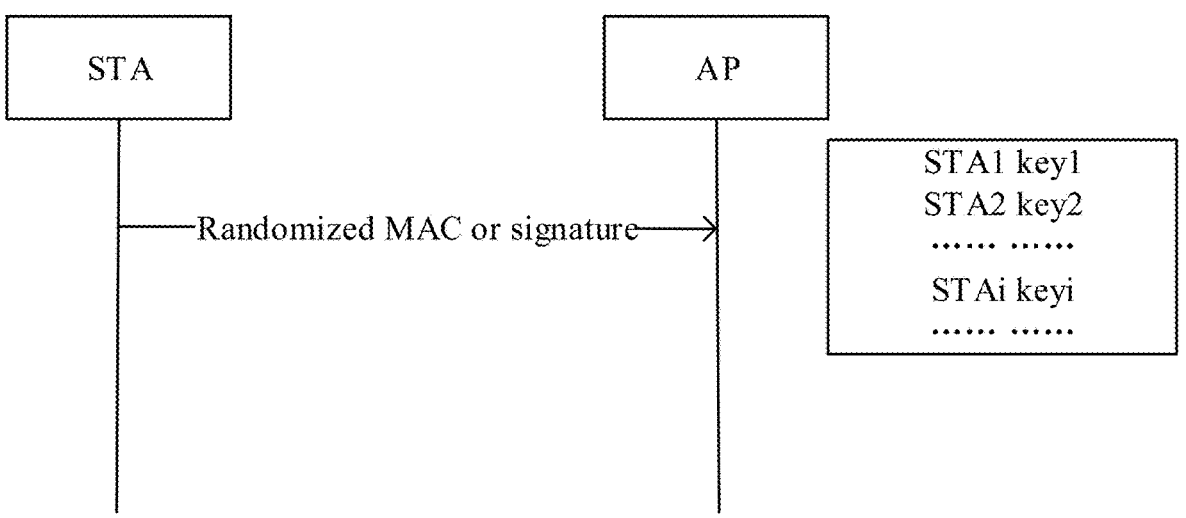
FIG. 5 is a schematic diagram illustrating a brute force testing according to the present disclosure.

In the first solution mentioned above, the AP is configured to cache the MAC address identity recognition key of the STA in order to identify the STA, but since more than one STA may be associated with the AP at the same time, the MAC address identity recognition keys of the more than one STA may be stored at the AP end, as illustrated in FIG. 5. When the AP is recognizing the randomized MAC or signature of an STA through the MAC address identity recognition key, the AP is configured to try each the locally stored MAC address identity recognition key until a MAC address identity recognition key is recognized successfully, or all the MAC address identity recognition keys are tried.

The brute force testing leads to the increased complexity and the relatively low time efficiency at the receiving end.

In the first solution mentioned above, in response to an attacker continuously sending frames to the AP to attack the AP, the AP is still configured to recognize the frames from the attacker, which not only is time wasting, but further may even cause the AP to be crashed due to constant computational work for identity recognition.

In the second solution mentioned above, the MAC allocation device (corresponding to the AP) is configured to assign the "prefix" and the "prefix" is configured to identify the STA. The "prefix" is unencrypted and unrepeatable, so the "prefix" may be eavesdropped when the AP sends the prefix to the STA, and the STA may be located due to the uniqueness of the prefix, so that the STA becomes easily traced.

In the third solution mentioned above, the MAC address is mainly allocated by the MAC allocation device (corresponding to the AP), all the MAC addresses are collectively allocated by the MAC allocation device, and the STA may only pick the randomized MAC address from a limited set allocated by the AP, thereby reducing the flexibility of the MAC address randomization. In the technical solutions provided by the present disclosure, the STA may generate the MAC address thereof in any way. The sequence number in the technical solutions provided by the present disclosure corresponds to the MAC address identity recognition key at the AP end, rather than the MAC address.

Based on the issues above, the present disclosure proposes a solution to perform the identity uniqueness recognition on the STA device that adopts the randomized MAC address, which allows promptly performing the identity uniqueness recognition on the STA device that adopts the randomized MAC address.

The technical solutions provided by the present disclosure are described in detail below according to specific embodiments.

Figure 6:
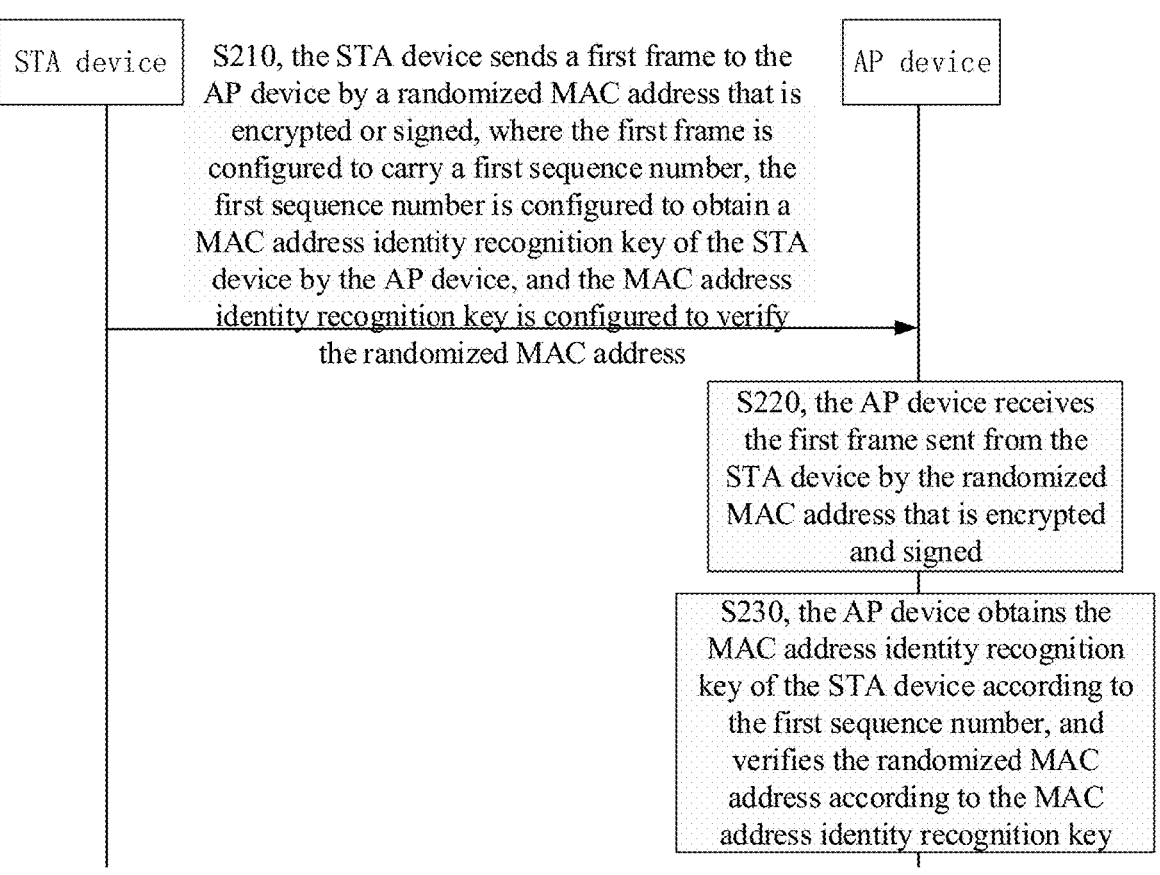
FIG. 6 is a flowchart of a wireless communication method according to an embodiment of the present disclosure.

FIG. 6 is a flowchart of a wireless communication method 200 according to an embodiment of the present disclosure. As illustrated in FIG. 6, the wireless communication method 200 may include at least part of the following operations.

At operation S210, a STA device is configured to send a first frame to the AP device by a randomized MAC address that is encrypted or signed; the first frame is configured to carry a first sequence number, the first sequence number is configured to obtain a MAC address identity recognition key of the STA device by the AP device, and the MAC address identity recognition key is configured to verify the randomized MAC address.

At operation S220, that the AP device is configured to receive that first frame sent from the STA device with the randomized MAC address that is encrypted or signed.

At operation S230, the AP device is configured to obtain the MAC address identity recognition key of the STA device according to the first sequence number, and the AP device is configured to verify the randomized MAC address according to the MAC address identity recognition key.

The AP device is configured to cache the MAC address identity recognition key of the STA device in order to identify the STA device that adopts the randomized MAC address. However, since more than one STA device may be associated with the AP device at the same time, the AP device is configured to store the MAC address identity recognition keys of the more than one STA device. In the embodiments of the present disclosure, the AP device may promptly identify the MAC address identity recognition key of the STA device from the MAC address identity recognition keys of the more than one STA device according to the first sequence number, in order to promptly verify the randomized MAC address adopted by the STA device, and thus recognizing the identity uniqueness of the STA device. Avoiding a means of the brute force testing illustrated in FIG. 5 above improves the efficiency of the identity uniqueness recognition and reduces the complexity of the AP device.

In the embodiments of the present disclosure, in a case where the STA device sends the first frame to the AP device with a randomized MAC address that is encrypted, the STA device may encrypt the randomized MAC address according to the MAC address identity recognition key of the STA device.

In the embodiments of the present disclosure, in the case where the STA device sends the first frame to the AP device with a randomized MAC address that is signed, the STA device may sign the randomized MAC address according to the public key of the STA device.

In the embodiments of the present disclosure, the first sequence number is configured to obtain the MAC address identity recognition key of the STA device by the AP device, i.e., the first sequence number corresponds to the MAC address identity recognition key of the STA device, and the AP device is configured to store such correspondence relationship locally.

In some embodiments, the randomized MAC address is a MAC address randomly adopted by the STA device.

In some embodiments, the randomized MAC address may be permanent or may be only used for a relatively short period, in order to hide a true identity of the device.

In some embodiments, the randomized MAC address changes over time, e.g., a change to the randomized MAC address may be periodic, event-driven, or triggered by other events. Alternatively, the change to the randomized MAC address may occur within a few minutes or less.

In the embodiments of the present disclosure, the "sequence number" may further be referred to as an "index" or an "identifier", or the like, and the present disclosure is not limited thereto.

In some embodiments, the MAC address identity recognition key may include but not be limited to, one of the following:

a cryptographic key, a public key, a hash function, a hash seed, a hash chain version number, and so on.

In some embodiments, the MAC address identity recognition key may include but not be limited to, a combination of one of the following and other information:

the cryptographic key, the public key, the hash function, the hash seed, the hash chain version number, and so on.

In some embodiments, the AP device may apply the MAC address identity recognition key of the STA device in, including but not limited to, performing an encrypted comparison or reverse decrypted comparison among some or all of the randomized MAC addresses.

In some embodiments, the present disclosure includes, but is not limited to, identifying the randomized MAC addresses for 802.11 networks, and is further applicable to a randomized address recognition on Bluetooth as well as a randomized address recognition on other networks.

In some embodiments, the first sequence number is a sequence number randomly selected by the STA device from a set of sequence numbers corresponding to the MAC address identity recognition keys. That is, the sequence number in the set of sequence numbers corresponds to the MAC address identity recognition key.

In some embodiments, the set of sequence numbers includes one or more sequence numbers.

In the embodiments of the present disclosure, the "set of sequence numbers" may further be referred to as a "list of sequence numbers", or the like, and the present disclosure is not limited thereto.

In some embodiments, the set of sequence numbers is assigned by the AP device, or the set of sequence numbers is determined by the STA device according to a range of sequence numbers assigned by the AP device. That is, the set of sequence numbers is known to the AP device, or the range of sequence numbers where the set of sequence numbers belongs to is known to the AP device.

Specifically, for example, sequence numbers in the set of sequence numbers are some or all of the sequence numbers in a range of sequence numbers assigned by the AP device. For example, the set of sequence numbers includes the first m sequence numbers in the range of sequence numbers assigned by the AP device, or the set of sequence numbers includes the last m sequence numbers in the range of sequence numbers assigned by the AP device. As another example, the set of sequence numbers includes all the sequence numbers at odd locations in the range of sequence numbers assigned by the AP device. As another example, the set of sequence numbers includes all the sequence numbers at even locations in the range of sequence numbers assigned by the AP device.

In some embodiments, the set of sequence numbers includes at least consecutive sequence numbers. For example, the set of sequence numbers includes sequence numbers 0-5. As another example, the set of sequence numbers includes: sequence numbers 0-5, and sequence numbers 8-10.

In some embodiments, the set of sequence numbers includes at least non-consecutive sequence numbers. For example, the set of sequence numbers includes: sequence number 0, sequence number 3, and sequence number 5. As another example, the set of sequence numbers includes: sequence number 0, sequence number 3, sequence number 5, and sequence numbers 8-10.

In some embodiments, sequence numbers corresponding to different MAC address identity recognition keys may share at least one sequence number. Therefore, the STA device becomes impossible to be uniquely located through the sequence number, which further increases the difficulty for an eavesdropper or the attacker to determine the identity of the STA device through the sequence number.

In some embodiments, sequence numbers corresponding to different MAC address identity recognition key are different.

In some embodiments, the AP device is configured to send a first message to the STA device. The first message includes sequence number information encrypted by the public key of the STA device. The sequence number information includes a sequence number in the set of sequence numbers or a range of sequence numbers, where the range of sequence numbers includes at least a sequence number in the set of sequence numbers. The sequence number information is assigned by the AP device according to the MAC address identity recognition key, or the sequence number information is assigned by the AP device according to the public key of the STA device. Further, the STA device is configured to obtain the sequence number information by decrypting the encrypted sequence number information according to the private key of the STA device, and the STA device determines the set of sequence numbers according to the sequence number information.

For example, the sequence number information includes a sequence number in the set of sequence numbers, in which case the AP device directly assigns the set of sequence numbers.

As another example, the sequence number information includes the range of sequence numbers, in which case the AP device assigns a range of sequence numbers, and the STA device may determine the set of sequence numbers based on the range of sequence numbers.

In some embodiments, the AP device is configured to send the first message to the STA device when the STA device is in a network access phase.

In the embodiments of the present disclosure, in order to reduce the complexity of the identity recognition on the STA device, in the network access phase of the STA device, the AP device is configured to assign the set of sequence numbers to the STA device in advance. The set of sequence numbers corresponds to the MAC address identity recognition key, and the MAC address identity recognition key of the STA device may be retrieved according to the sequence number in the set of sequence numbers, in order to promptly perform the identity recognition on the STA device.

Further, after the AP device assigning the set of sequence numbers, the AP device encrypts the set of sequence numbers through the public key of the STA device and then send the encrypted sequence numbers to the STA device. The sequence numbers of different STA devices may overlap each other. After the STA device receiving the set of sequence numbers, the STA device decrypts the set of sequence numbers through the private key of the STA device, and each time the STA device interacts with the AP device, the STA device is configured to carry the sequence number that is selected from the decrypted set of sequence numbers in the communication process. After the AP device receiving the sequence number, the AP device retrieves the MAC address identity recognition key through the sequence number, thereby promptly performing the identity recognition on the STA device. Specifically, through encrypting the set of sequence numbers, it is possible to avoid the risk of eavesdropping when the AP device sends the set of sequence numbers to the STA device. Further, the sequence numbers of different STA devices are allowed to overlap with each other, so that the STA device becomes impossible to be uniquely located through the sequence number, which further increases the difficulty for the eavesdropper to determine the identity of the STA device through the sequence number. Therefore, the user privacy may be further safeguarded while the process complexity of the AP device is reduced.

In some embodiments, the first message is sent through a first authentication frame. The first authentication frame includes a first field, and the first field is configured to indicate the encrypted sequence number information. For example, the first field is a key sequence list field.

In some embodiments, the first field includes n key sequence fields. Each of the n key sequence fields is configured to indicate an encrypted sequence number, and each of the n key sequence fields corresponds to a sequence number in the encrypted sequence number information, where n is a positive integer.

Figures 7, 8, 9:
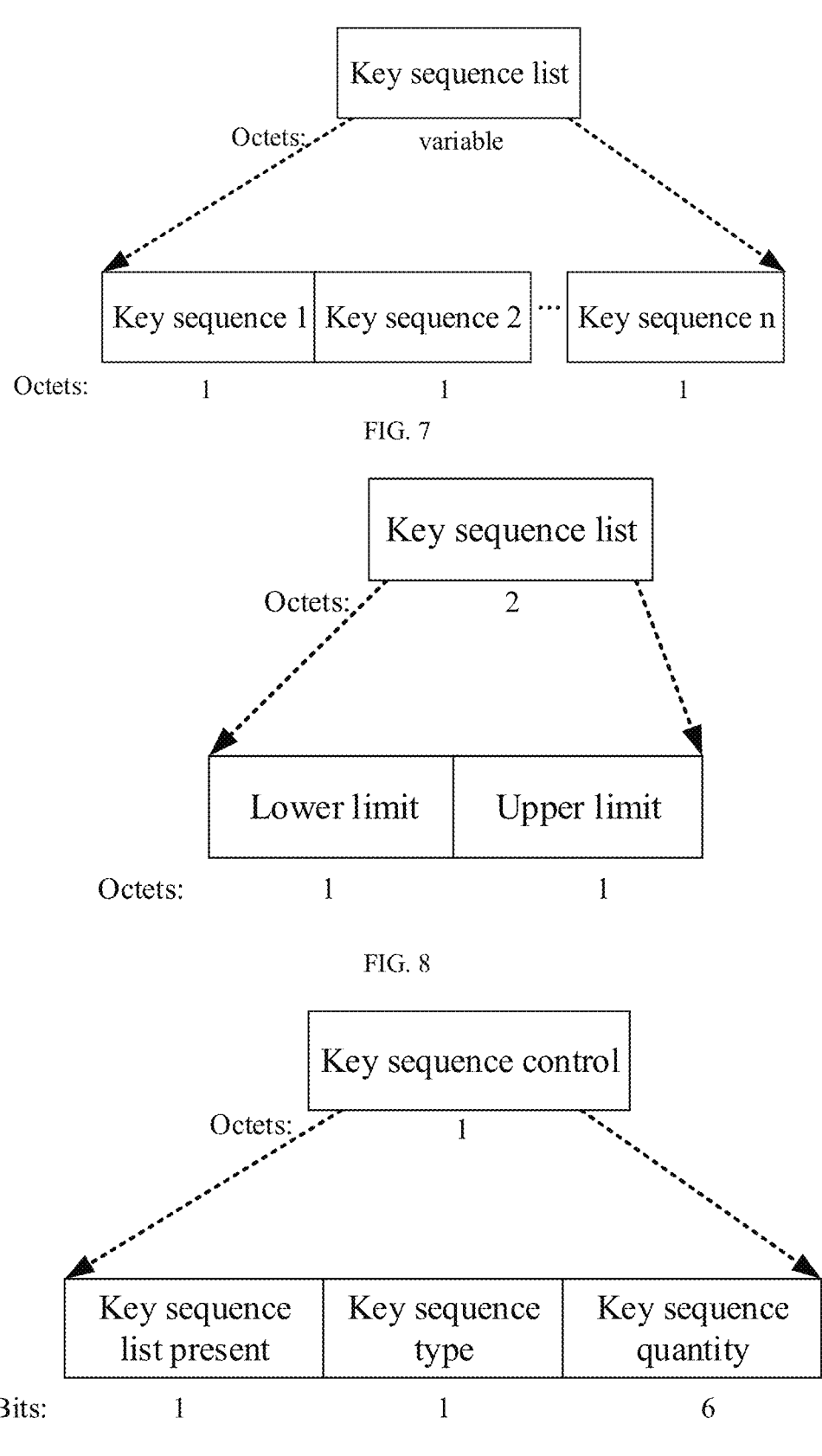
FIG. 7 is a schematic diagram illustrating a key sequence list field according to an embodiment of the present disclosure.
FIG. 8 is a schematic diagram illustrating another key sequence list field according to an embodiment of the present disclosure.
FIG. 9 is a schematic diagram illustrating a key sequence control field according to an embodiment of the present disclosure.

For example, as illustrated in FIG. 7, the first field is a key sequence list field. The key sequence list field includes n key sequence fields, and each of the n key sequence fields indicates an encrypted sequence number, respectively.

In some embodiments, the first field includes a lower limit field and an upper limit field. The lower limit field is configured to indicate a starting sequence number in the encrypted sequence number information, and the upper limit field is configured to indicate an ending sequence number in the encrypted sequence number information.

For example, as illustrated in FIG. 8, the first field is the key sequence list field and the key sequence list field includes the lower limit field and the upper limit field. The lower limit field is configured to indicate the starting sequence number in the encrypted sequence number information, and the upper limit field is configured to indicate the ending sequence number in the encrypted sequence number information.

In some embodiments, the first authentication frame includes a second field. The second field includes first identification information, second identification information, and third identification information. The first identification information is configured to indicate whether the first field exists, the second identification information is configured to indicate a type of content in the first field, and the third identification information is configured to indicate the number of encrypted sequence numbers indicated by the first field. For example, the second field is a key sequence control field. The first identification information is key sequence list present bit, the second identification information is a key sequence type bit, and the third identification information is a key sequence quantity bit.

In some embodiments, when the second identification information takes a first value, the second identification information is configured to indicate that the first field includes a field that is configured to indicate a value of the encrypted sequence number, i.e., the first field may correspond to the key sequence list field illustrated in FIG. 7 above.

In some embodiments, when the second identification information takes a second value, the second identification information is configured to indicate that the first field includes a field that is configured to indicate a range of the encrypted sequence number, i.e., the first field may correspond to the key sequence list field illustrated in FIG. 8 above.

For example, as illustrated in FIG. 9, the second field is a key sequence control field. The key sequence control field includes the key sequence list present bit, the key sequence type bit, and the key sequence quantity bit. Specifically, the key sequence list present bit is configured to indicate whether the key sequence list field exist, where a value of 1 indicates that the key sequence list field exists and a value of 0 indicates that the key sequence list field does not exist; alternatively, a value of 0 indicates that the key sequence list field exists and a value of 1 indicates that the key sequence list field does not exist. The key sequence type bit is configured to indicate a meaning of content in the key sequence list field. The key sequence type bit exists only when the value of the key sequence list present bit indicates that the key sequence list field exists. A value of 1 for the key sequence type bit indicates that the key sequence list field holds a specific sequence number value (i.e., FIG. 7 above), and a value of 0 for the key sequence type bit indicates that the key sequence list field holds a range of the sequence numbers (i.e., FIG. 8 above); alternatively, a value of 0 for the key sequence type bit indicates that the key sequence list field holds a specific sequence number value (i.e., FIG. 7 above), and a value of 1 for the key sequence type bit indicates that the key sequence list field holds a range of the sequence numbers (i.e., FIG. 8 above). The key sequence quantity bit is configured to indicate that the number of sequence numbers indicated by the key sequence list field. The key sequence quantity bit exists, only when the value of the key sequence list present bit indicates that the key sequence list field exists, and the value of the key sequence type bit indicates that the key sequence list field holds a specific sequence number value.

In some embodiments, the first field is the key sequence list field and the second field is the key sequence control field. The key sequence list field and the key sequence control field belong to the key sequence info field of the first authentication frame.

Figure 10:
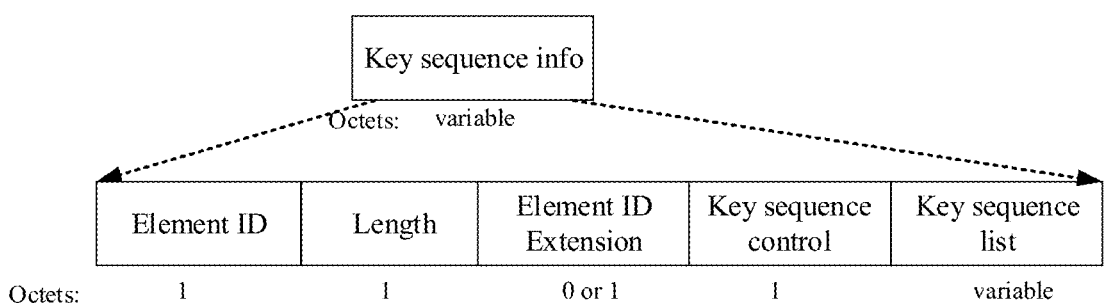
FIG. 10 is a schematic diagram illustrating a key sequence info field according to an embodiment of the present disclosure.

For example, as illustrated in FIG. 10, the key sequence info field includes the key sequence list field and the key sequence control field.

In some embodiments, in a case where the STA device sends the first frame with the randomized MAC address that is encrypted, the set of sequence numbers is assigned by the AP device according to the MAC address identity recognition key.

In some embodiments, before the STA device receiving the first message from the AP device, the STA device sends a second message to the AP device. The second message includes the MAC address identity recognition key and the public key of the STA device. In this case, the AP device may be configured to assign the sequence number to the STA device according to the MAC address identity recognition key, and encrypt the assigned sequence number according to the public key of the STA device.

In some embodiments, the second message is sent through a second authentication frame. The second authentication frame includes an identity key field, and the identity key field includes a public key field and an address key field. The public key field is configured to indicate the public key of the STA device, and the address key field is configured to indicate the MAC address identity recognition key.

Figure 11:
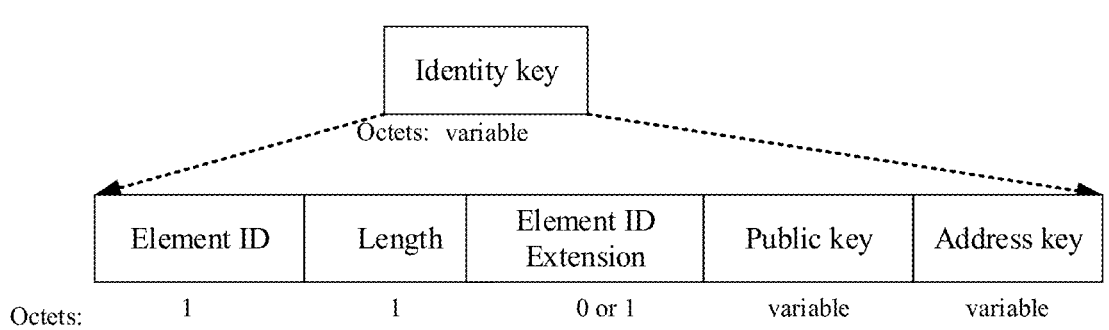
FIG. 11 is a schematic diagram illustrating an identity key field according to an embodiment of the present disclosure.

For example, as illustrated in FIG. 11, the identity key field may include the public key field and the address key field. The public key field is configured to indicate the public key of the STA device, and the address key field is configured to indicate the MAC address identity recognition key.

In some embodiments, in the case where the STA device sends the first frame with a randomized MAC address that is signed, the set of sequence numbers is assigned by the AP device according to the public key of the STA device.

In some embodiments, before the STA device receiving the first message from the AP device, the STA device is configured to send a third message that includes the public key of the STA device to the AP device. In this case, the AP device may be configured to assign a sequence number to the STA device according to the public key of the STA device, and encrypt the assigned sequence number according to the public key of the STA device.

In some embodiments, the third message is sent through a third authentication frame. The third authentication frame includes an identity key field, and the identity key field includes a public key field. The public key field is configured to indicate the public key of the STA device.

Figure 12:
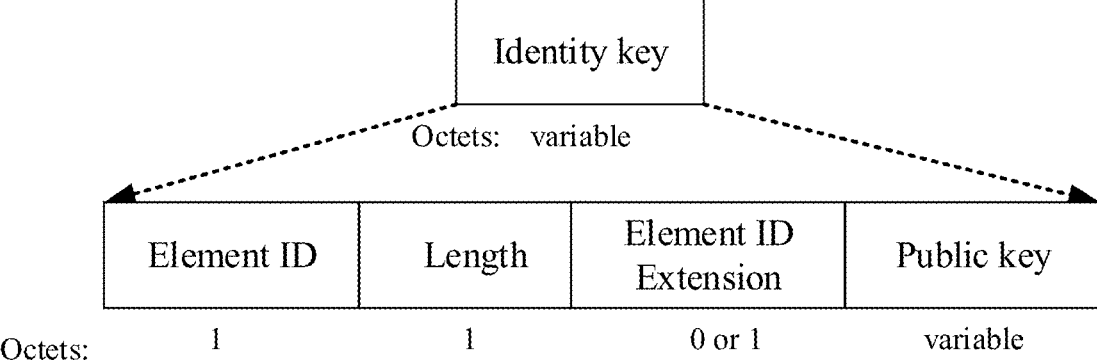
FIG. 12 is a schematic diagram illustrating another identity key field according to an embodiment of the present disclosure.

For example, as illustrated in FIG. 12, the identity key field may include the public key field, and the public key field is configured to indicate the public key of the STA device.

Figure 13:
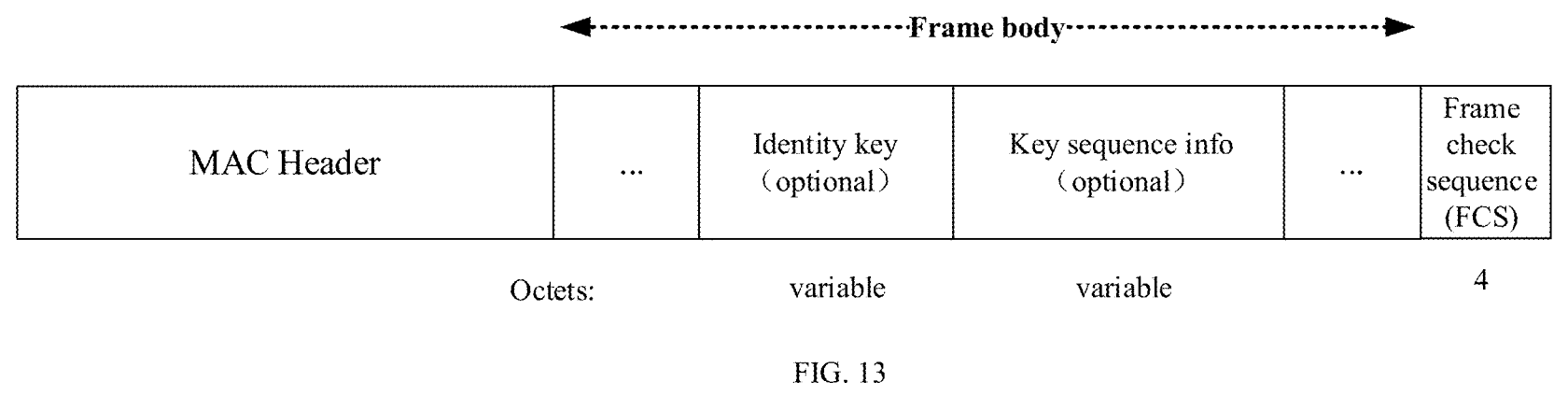

For example, as illustrated in FIG. 13, the authentication frame may include the identity key field and the key sequence info field.

In some embodiments, the identity key field and the key sequence info field may be placed in other positions of the frame structure or subfields of the field, in a real-world implementation according to different needs, so that the solution may adapt to the different needs. However, all equivalent substitutions and changes based on the technical solutions and their inventive concepts are considered to fall within the scope of protection of the disclosure.

In some embodiments, the "field" may be referred to as an "element". For example, the identity key field may be referred to as an identity key element, and the key sequence info field may be referred to as a key sequence info element.

In some embodiments, the first frame is one of: an association request frame, a reassociation request frame, and a data frame. Apparently, the first frame may be any other frame, and the present disclosure is not limited thereto.

In some embodiments, the first frame includes a key sequence field, and the key sequence field is configured to indicate the first sequence number.

Figure 14:
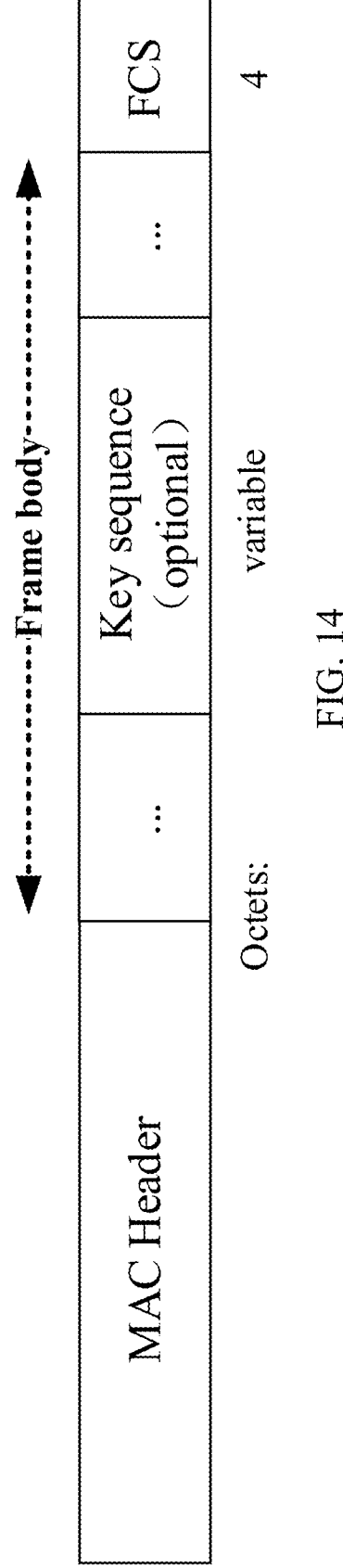
FIG. 14 is a schematic diagram illustrating an association request frame/a reassociation request frame according to an embodiment of the present disclosure.

For example, as illustrated in FIG. 14, the first frame is an association request frame or a reassociation request frame. The association request frame or the reassociation request frame includes a key sequence field, and the key sequence field is configured to indicate the first sequence number.

Figure 15:
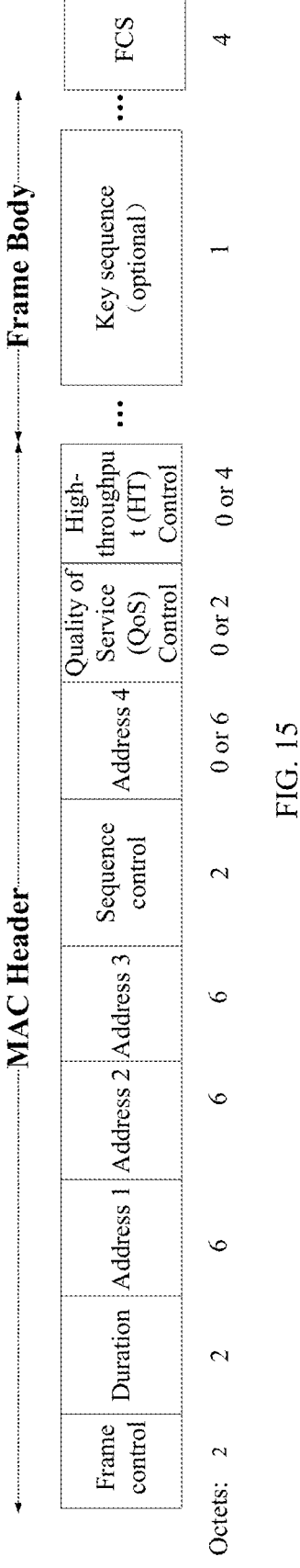
FIG. 15 is a schematic diagram illustrating a data frame according to an embodiment of the present disclosure.

As another example, as illustrated in FIG. 15, the first frame is the data frame. The data frame includes a key sequence field, and the key sequence field is configured to indicate the first sequence number.

In response to the AP device assigning specific sequence number values in an identity recognition phase, the STA device selects any one of the specific sequence number values as a key sequence (i.e., the sequence number indicated by the key sequence field); in response to the AP device assigning a range of sequence numbers in the identity recognition phase, the STA device randomly generates a random number that falls in the range as the key sequence (i.e., the sequence number indicated by the key sequence field).

In some embodiments, the first frame is configured to carry first indication information, and the first indication information is configured to indicate that the AP device needs to perform the identity recognition on the STA device.

In some embodiments, before the STA device sending the first frame to the AP device with the randomized MAC address that is encrypted or signed, the STA device sends a disassociation frame to the AP device by the MAC address thereof. The disassociation frame is configured to disassociate the STA device from the AP device. Accordingly, before the AP device receiving the first frame sent from the STA device with the MAC address of the STA device that is encrypted or signed, the AP device receives the disassociation frame sent from the STA device with the MAC address of the STA device.

In some embodiments, the disassociation frame includes a third field, and the third field is configured to indicate that the STA device is about to change the MAC address. For example, the third field is a reason code field.

For example, a frame structure of the disassociation frame may be illustrated in table 1.

TABLE 1

| Order | Information |
|---|---|
| 1 | Reason code |
| Last-1 | One or more Vendor Specific elements are optionally provided |
| Last | A mobile management entity (MME) is present when a management frame protection is enabled at the AP and the frame is a group addressed frame |

Note:
The MME appears after all fields protected by the MME. Therefore, the MME is appears last in the frame body to protect the frame.

In some embodiments, the AP device turns on an identity recognition program. In response to the AP device enabling the identity recognition program, the AP device verifies the randomized MAC address according to the MAC address identity recognition key.

In some embodiments, before the STA device sends the first frame to the AP device with the randomized MAC address that is encrypted and signed, the STA device sends a fourth message to the AP device with the MAC address thereof. The fourth message is configured to request the AP device to turn on the identity recognition program, or to notify the AP device to turn on the identity recognition program. In response to the AP device turning on the identity recognition program, the AP device verifies the randomized MAC address according to the MAC address identity recognition key.

In some embodiments, the STA device may not need to obtain feedback from the AP device after the STA device sending the fourth message. That is, in response to the AP device receiving the fourth message, the AP device turns on the identity recognition program without a need of providing feedback to the STA device.

In some embodiments, the STA device receives a fifth message from the AP device. The fifth message is configured to indicate that the AP device turns on the identity recognition program.

In order to avoid a malicious launch of the identity recognition program by the attacker, the present disclosure adds an identity recognition program launch process. Before a legitimate STA device that is authenticated by the AP device changing the MAC address, the legitimate STA device needs to send an identity recognition program launch request to the AP device to request the AP device to turn on the identity recognition program. In response to the AP device receiving the request sent from the STA device, the AP device turns on the identity recognition program and replies with an identity recognition program launch response. The identity recognition program would be closed after being turned on for a period of time. When no STA device sends the request to turn on the identity recognition program, the AP device keeps the identity recognition program in an off state, where an association process is carried out normally but the identity recognition is not performed for the frame sent from the attacker, so as to avoid the AP device from crashing due to performing the identity recognition on the attacker.

In some embodiments, more than one fourth message may correspond to one fifth message.

In some embodiments, the fourth message is sent through a second frame. A frame control field of the second frame includes a fourth field, and the fourth field is configured to request the AP device to turn on the identity recognition program. For example, when the fourth message is configured to request the AP device to turn on the identity recognition program, the second frame is a randomized and changing MAC address (RCM) identify request frame. As another example, when the fourth message is configured to notify the AP device to turn on the identity recognition program, the second frame is a management frame (e.g., a notification frame, an announcement frame, etc.).

Figure 16:
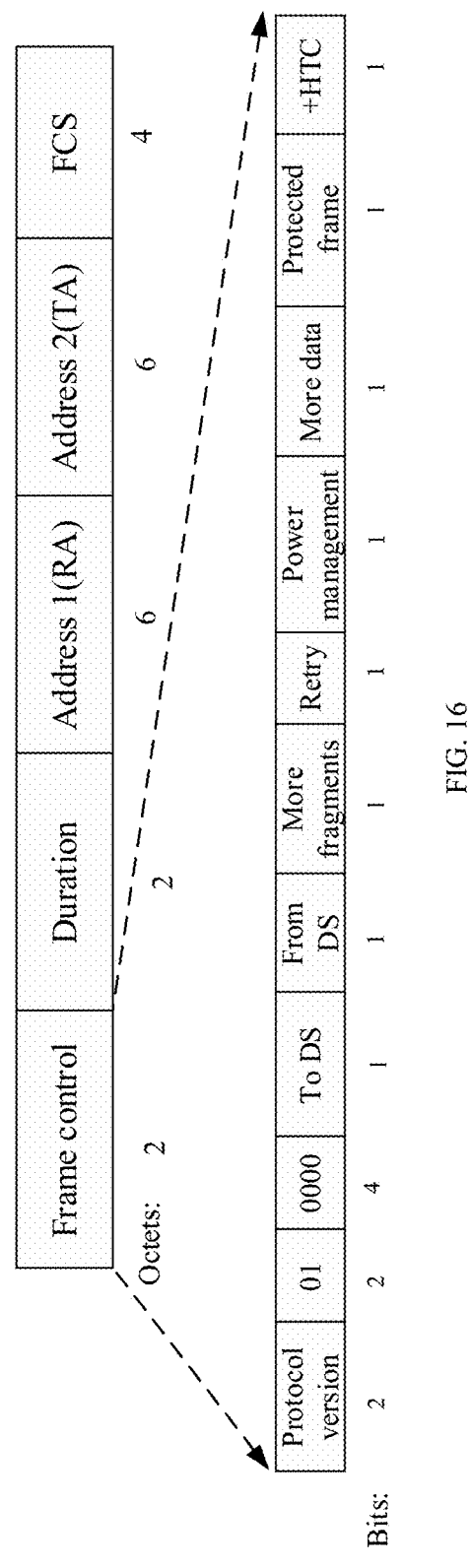
FIG. 16 is a schematic diagram illustrating a randomized and changing MAC address (RCM) identity response frame according to an embodiment of the present disclosure.

For example, the RCM Identify Request frame is configured to request the AP device to turn on the identity recognition program before the STA device changing the MAC address. As illustrated in FIG. 16, a type field of the frame control field is 01, and subtype fields of the frame control field is 0000, respectively.

In some embodiments, the fifth message is sent through a third frame. The frame control field of the third frame includes a fifth field, and the fifth field is configured to indicate that the AP device turns on the identity recognition program. For example, the third frame is an RCM identify response frame.

Figure 17:
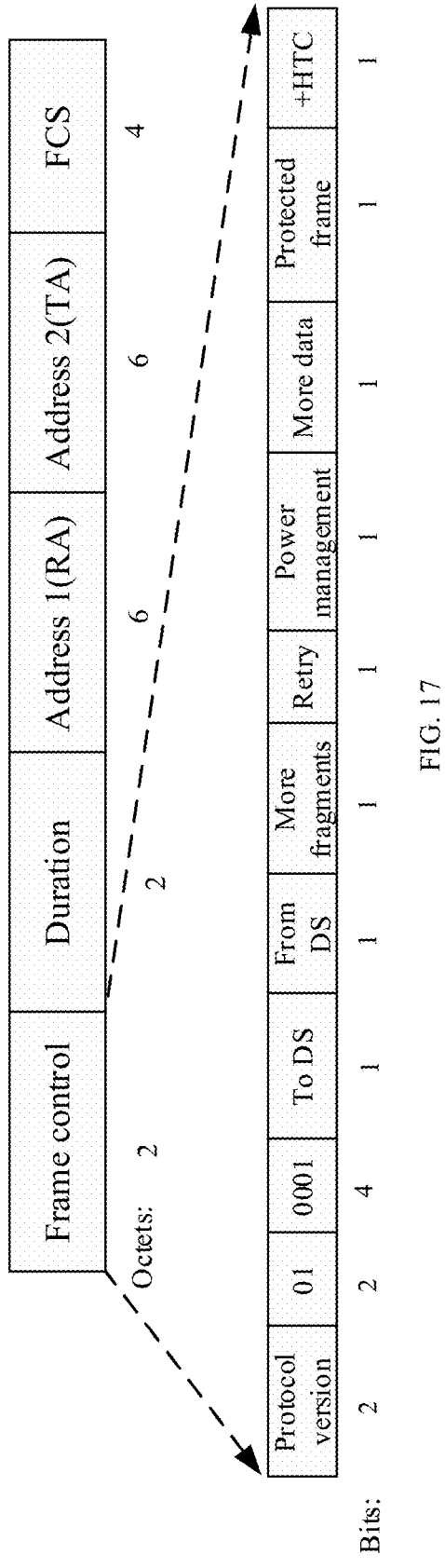
FIG. 17 is a schematic diagram illustrating a RCM identify request frame according to an embodiment of the present disclosure.

For example, the RCM identify response frame is configured to reply to the STA device by the AP device after the AP device turning on the identity recognition program. As illustrated in FIG. 17, the type field of the frame control field is 01, and the subtype fields of the frame control field are 0001, respectively.

As illustrated in FIG. 16 and FIG. 17, the frame control field includes the following fields in addition to the type field and the subtype fields:

protocol version, type, subtype, to distribution system (DS), from DS, more fragments, retry, power management, more data, protected frame, +high-throughput control (HTC).

In some embodiments, the AP device turns off the identity recognition program after the identity recognition program being turned on for a first period of time. That is, after the identity recognition program being turned on for the first period of time, the AP device may force the identity recognition program to be turned off or actively turns off the identity recognition program. In this case, there is no need to determine whether a randomized MAC address that passes verification within the first period of time exists, or there is no need to determine whether a randomized MAC address that fails to pass verification within the first period of time exists.

For example, the first period of time is determined by the AP device, or the first period of time is negotiated between the STA device and the AP device, or the first period of time is agreed upon.

In some embodiments, when no randomized MAC address passes verification within a second period of time after the identity recognition program being turned on, the AP device turns off the identity recognition program. In this case, it is necessary to determine whether a randomized MAC address that passes verification within the second period of time exists.

For example, the second period of time is determined by the AP device, or the second period of time is negotiated between the STA device and the AP device, or the second period of time is agreed upon.

In some embodiments, the identity recognition process in the present disclosure may be illustrated in FIG. 18, and may include some or all of operations S11-S15. The identity recognition process may be specifically divided into three main parts, i.e. an interaction of information required for the identity recognition program, a request to turn on the identity recognition program, and an operation of the identity recognition program.

At operation S11, in an identity authentication phase, the STA and the AP finish interacting the information required for the identity recognition program (including: the set of sequence numbers, the MAC address identity recognition key, and the public key of the STA).

At operation S12, before a legitimate STA changing a MAC address thereof, the legitimate STA sends a frame with the original MAC address to interact with the AP, and the frame is configured to inform the AP that the original MAC address is about to be changed and request the AP to turn on the identity recognition program.

At operation S13, the STA changes the randomized MAC address thereof in an arbitrary manner, and signs or encrypts the randomized MAC.

At operation S14, the STA sends a frame that includes a sequence number to the AP with the randomized MAC address that is changed.

At operation S15, the AP promptly retrieves the MAC address identity recognition key of the STA according to the sequence number, promptly finishes the identity recognition on the STA through the identity recognition program, and identifies an attacker.

In some embodiments, the interaction of information required for the identity recognition program occurs in the identity authentication phase. In order to make sure that a subsequent identity recognition program may be properly turned on, a necessary information interaction needs to be performed in an early stage. The interaction of information required for the identity recognition program includes the STA sending the MAC address identity recognition key and the public key to the AP using an identity authentication frame, as well as the AP assigning a corresponding set of sequence numbers for the MAC address identity recognition key of the STA. The specific process may be illustrated in FIG. 19, and may include some or all of operations S21-S24. A frame interaction modification may be specifically illustrated in FIG. 20.

At operation S21, in the identity authentication phase, a STA carries a MAC address identity recognition key and a public key of the STA in an authentication frame 0.

At operation S22, in response to the AP receiving the MAC address identity recognition key and the public key of the STA, the AP assigns a set of sequence numbers to the MAC address identity recognition key of the STA. The set of sequence numbers may include sequence numbers that are consecutive/non-consecutive. The set of sequence numbers are encrypted by the public key of the STA, and the sequence numbers of different MAC address identity recognition keys may duplicate.

At operation S23, in response to the STA passing the identity authentication, the AP carries the set of sequence numbers encrypted by the public key of the STA in a last frame in the authentication phase.

At operation S24, the STA receives the encrypted set of sequence numbers, decrypts through a private key thereof and caches the set of sequence numbers, in order to carry a sequence number in the set of sequence numbers in a subsequent frame.

Figure 22:
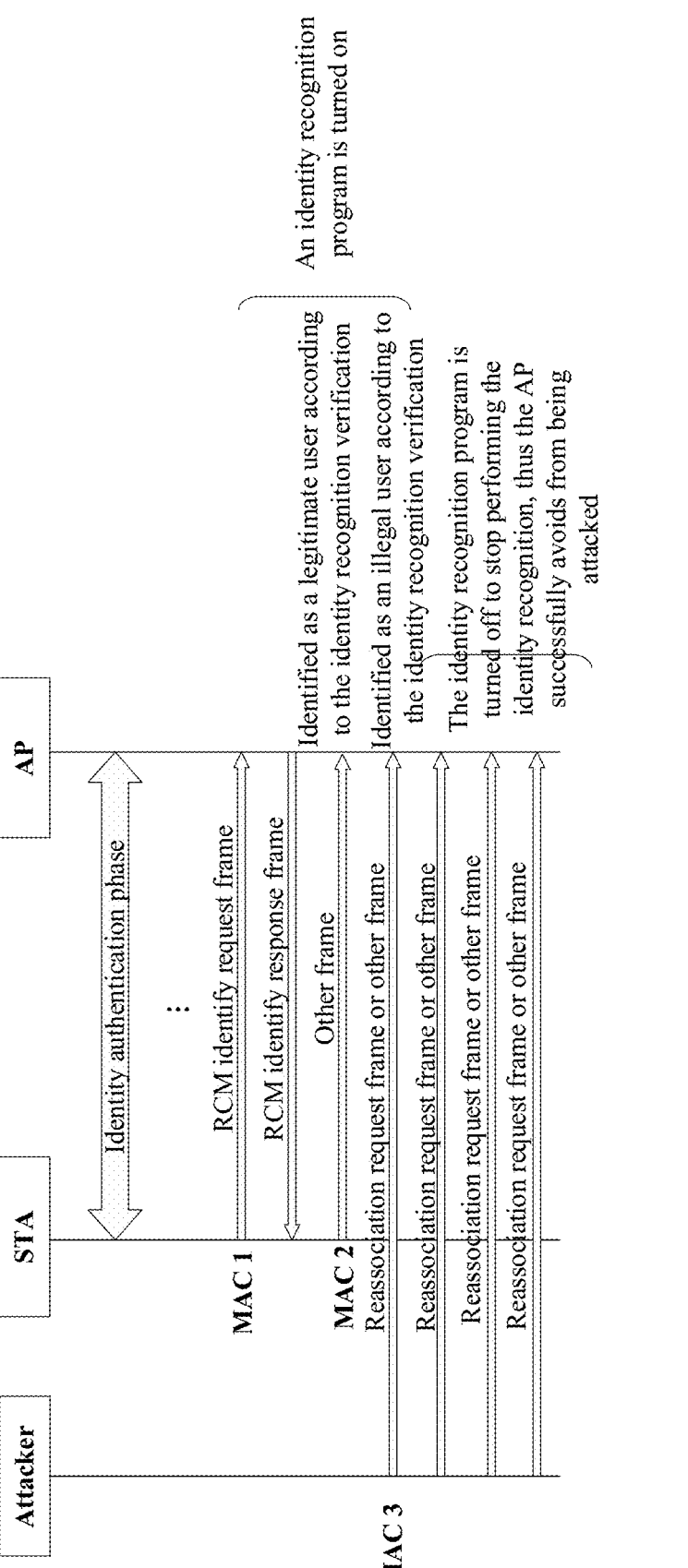
FIG. 22 is a schematic diagram illustrating a frame interaction of the request to turn on the identity recognition program according to an embodiment of the present disclosure.

In some embodiments, the request to turn on the identity recognition program occurs after the interaction of the information required for the identity recognition program being finished. After the legitimate STA passing the identity authentication with the AP, when the legitimate STA needs to change the randomized MAC address, the legitimate STA needs to perform a frame interaction with the AP by the original address to inform the AP that the MAC address of the legitimate STA is about to change and request the AP to turn on the identity recognition program, and the AP replies to the STA with frames when the AP agrees to turn on the identity recognition program. A specific frame interaction to complete the process is not limited, and the frame may be a newly defined frame or a frame modified based on an existing frame, all of which fall within the scope of protection of the present disclosure. For example, the STA may request the AP to turn on the identity recognition program through the RCM identify request frame illustrated in FIG. 16 above. As another example, the AP may reply to the STA that the identity recognition program is turned on through the RCM identify reply frame illustrated in FIG. 17 above. A specific process may be illustrated in FIG. 21, and may include some or all of operations S31-S36. The frame interaction modification may be specifically illustrated in FIG. 22.

At operation S31, at a point after the identity authentication, the STA needs to change the MAC address.

At operation S32, the STA sends an RCM identify request frame to the AP by the original MAC address to request the AP to turn on the identity recognition program.

At operation S33, in response to the AP receiving the RCM identify request frame, the AP turns on the identity recognition program and replies with an RCM identify response frame to notify the STA that the identity recognition program is turned on.

At operation S34, in response to the STA receiving the response sent from the AP, the STA may communicate with the AP by a randomized MAC address.

At operation S35, the AP promptly identifies a frame with an unknown MAC address, including a legitimate STA and an attacker, through the identity recognition program.

At operation S36, after a period of time, the AP turns off the identity recognition program.

In response to the identity recognition program being turned off, the AP no longer performs the identity recognition on the frame with the unknown MAC address, thereby shielding the attacker from continuous attacks and avoiding the AP from crashing.

Figure 24:
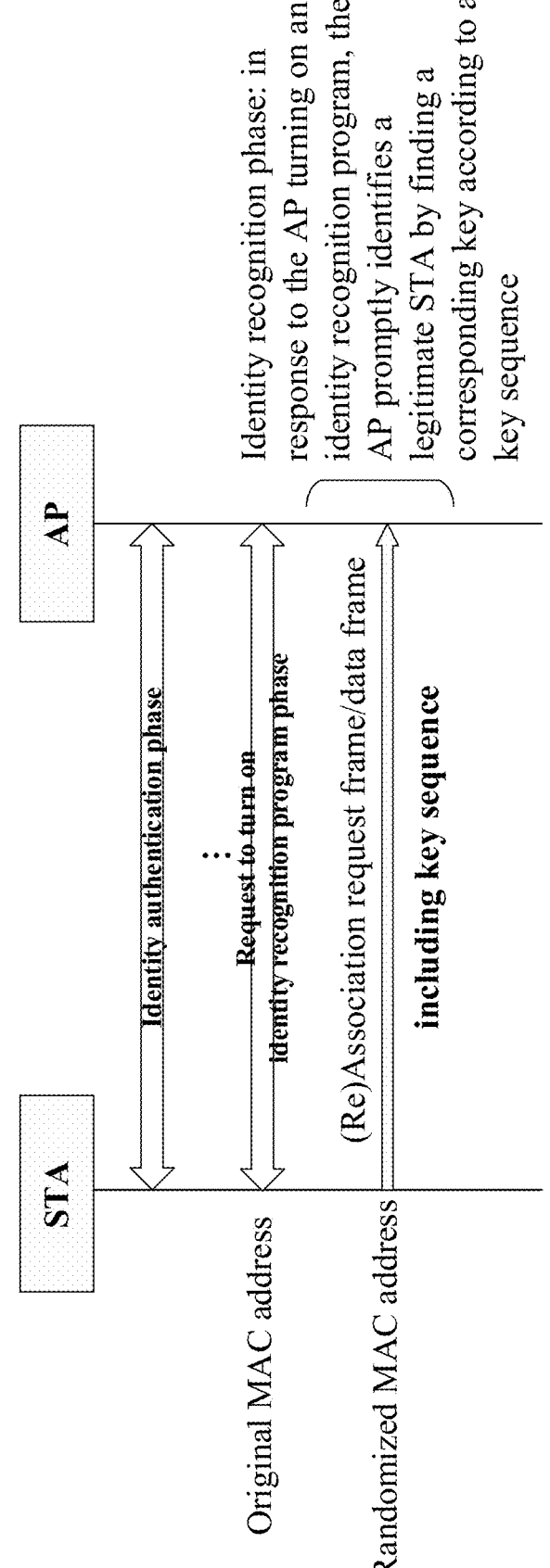
FIG. 24 is a schematic diagram illustrating a frame interaction of an identity recognition process according to an embodiment of the present disclosure.

In some embodiments, the operation of the identity recognition program occurs after the interaction of information required for the identity recognition program and the request to the AP to turn on the identity recognition program. In response to the STA receiving the feedback from the AP agreeing to turn on the identity recognition program, the STA may change the randomized MAC address and send frames to the AP by a newly randomized MAC address. The AP may promptly locate the MAC address identity recognition key of the STA through the sequence number in the frame, use the MAC address identity recognition key to promptly verify the randomized MAC address of the STA, and determine whether the STA is a legitimate STA. The specific process may be illustrated in FIG. 23, and may include some or all of operations S41-S44. The frame interaction modification may be specifically illustrated in FIG. 24.

At operation S41, in response to the STA receiving a response to the request to turn on an identity recognition, the STA generates a randomized MAC address in an arbitrary manner, signs or encrypts the randomized MAC address, and communicates with the AP by the randomized address.

At operation S42, when the STA communicates with the AP by the randomized MAC address, the STA carries any sequence number in the set of sequence numbers in a frame, where the frame may be an association request frame, a reassociation request frame, and a data frame.

At operation S43, in response to the AP receiving the frame that carries the sequence number, the AP queries a MAC address identity recognition key corresponding to the STA through the sequence number, and performs an unique-ness recognition on the STA; when the sequence numbers of different MAC address identity recognition keys duplicate, i.e., a sequence number corresponds to more than one MAC address identity recognition keys, the AP tries each the MAC address identity recognition key corresponding to the sequence number until the STA is successfully identified.

At operation S44, the AP turns off the identity recognition program, and stops performing the identity recognition on an unknown MAC address.

The following is a detailed description of the above-mentioned solutions of the wireless communication method 200 through Embodiment 1 to Embodiment 4.

The Embodiment 1 is to reduce the complexity of recognizing a randomized MAC address in the encryption method. When an STA uses a randomized MAC address and realizes the identity uniqueness recognition on the STA by encrypting the randomized MAC address, the MAC address identity recognition key delivered by the STA to the AP may become important information for the AP to identify the address of the STA. However, the AP end may locally store the MAC address identity recognition key of multiple different STAs. When the AP verifies the address using the MAC address identity recognition key, the AP has to try each the MAC address identity recognition key, which greatly increases a testing complexity at the AP side. The problem of brute force testing is particularly evident in an intensive scenario.

In the Embodiment 1, the AP assigns the sequence number to the MAC address identity recognition key of the STA to achieve an effect of reducing the testing complexity at the AP side. The specific process is illustrated as follows.
(1) the Interaction of Information Required for the Identity Recognition Program
①A scan phase: a scan process remains unchanged. The STA discovers the surrounding network by listening to a beacon frame or a probe response frame. After the scan is finished, the STA can choose one of the networks to join.
② An identity authentication phase: a STA using the randomized MAC address carries the MAC address identity recognition key and public key to an authentication frame and sends the authentication frame to the AP. In response to the AP receiving the authentication frame, the AP locally stores the MAC address identity recognition key of the STA, assigns a corresponding sequence number/range of sequence numbers to the MAC address identity recognition key, encrypts the corresponding sequence number/range of sequence numbers using the public key of the STA, and then transmits the encrypted sequence number/range of sequence numbers to the STA.
③ The STA receives the information encrypted by the public key of the STA and decrypts encrypted information using the private key of the STA to obtain the sequence number/range of sequence numbers.
(2) the Request to Turn on the Identity Recognition Program
① Assuming that the STA wants to change the MAC address in the network access/switch/data transmission phase after the identity recognition, the STA first sends a request, i.e., the RCM identify request frame, to the AP with the original address to turn on the identity recognition.
② In response to the AP receiving the request to turn on the identity recognition program, the AP turns on the program and replies with the RCM identify response frame.
(3) the Operation of the Identity Recognition Program
In response to the STA receiving a program launch response from the AP, the STA uses a randomized MAC address and encrypts the randomized MAC address. The STA carries a sequence number in the frame, e.g., the association request frame/reassociation request frame/data frame, for the subsequent communication with the AP. In response to the AP receiving the frame with the sequence number, the AP may use the sequence number to promptly find the MAC address identity recognition key of the STA and perform the address recognition. After the address recognition passes, the AP further processes the frame sent from the STA.

Figure 25:
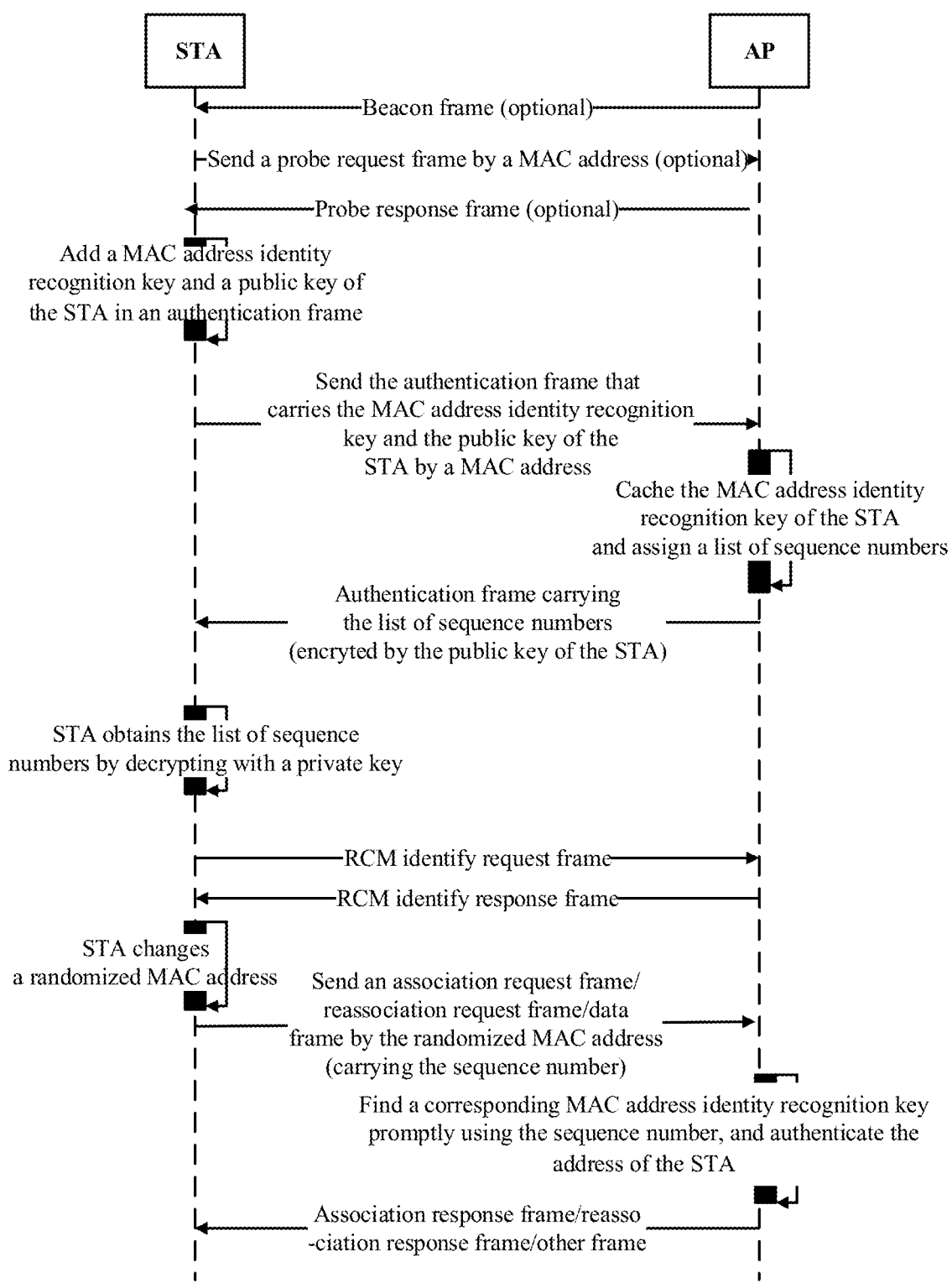
FIG. 25 is a flowchart illustrating a reduction of a complexity of recognizing a randomized MAC address in an encryption method according to an embodiment of the present disclosure.

In summary, a flowchart of the interaction provided in the Embodiment 1 that addresses the problem of brute force testing under the identification of the randomized MAC address using a certain key method may be illustrated in FIG. 25.

The Embodiment 2 is to reduce the complexity of identifying the randomized MAC address in the digital signature mechanism. When the STA uses the signature method to identify the randomized MAC addresses, the public key of the STA further becomes the MAC address identity recognition key, but the AP end may locally store the public keys of multiple different STAs. When the AP verifies the address using the public keys, the AP has to try each the public key, which greatly increases the testing complexity at the AP side. The problem of the brute force testing is particularly evident in the intensive scenario.

In the Embodiment 2, the AP assigns the sequence number to the public key of the STA to achieve an effect of reducing the testing complexity at the receiving end. The specific process is illustrated as follows.
(1) the Interaction of Information Required for the Identity Recognition Program
① The Scan phase: the scan process remains unchanged. The STA discovers the surrounding network by listening to a beacon frame or a probe response frame. After the scan is finished, the STA can choose one of the networks to join.
② The identity authentication phase: a STA using the randomized MAC address carries the public key as the MAC address identity recognition key in the authentication frame and sends the authentication frame to the AP. In response to the AP receiving the authentication frame, the AP caches the public key of the STA, assigns a corresponding sequence number to the public key of the STA, encrypts the corresponding sequence number using the public key of the STA, and then transmits the encrypted sequence number to the STA.
(2) the Request to Turn on the Identity Recognition Program
① Assuming that the STA wants to change the MAC address in the network access/switch/data transmission phase after the identity recognition, the STA first sends a request, i.e., the RCM identify request frame, to the AP with the original address to turn on the identity recognition.
② In response to the AP receiving the request to turn on the identity recognition program, the AP turns on the program and replies with the RCM identify response frame.
(3) the Operation of the Identity Recognition Program
In response to the STA receiving the program launch response from the AP, the STA uses a randomized MAC address and signs the randomized MAC address. The STA carries a signature and a sequence number in the frame, e.g., the association request frame/reassociation request frame/ data frame, for the subsequent communication with the AP. In response to the AP receiving the sequence number, the AP may promptly find the public key of the STA and perform the address recognition.

Figure 26:
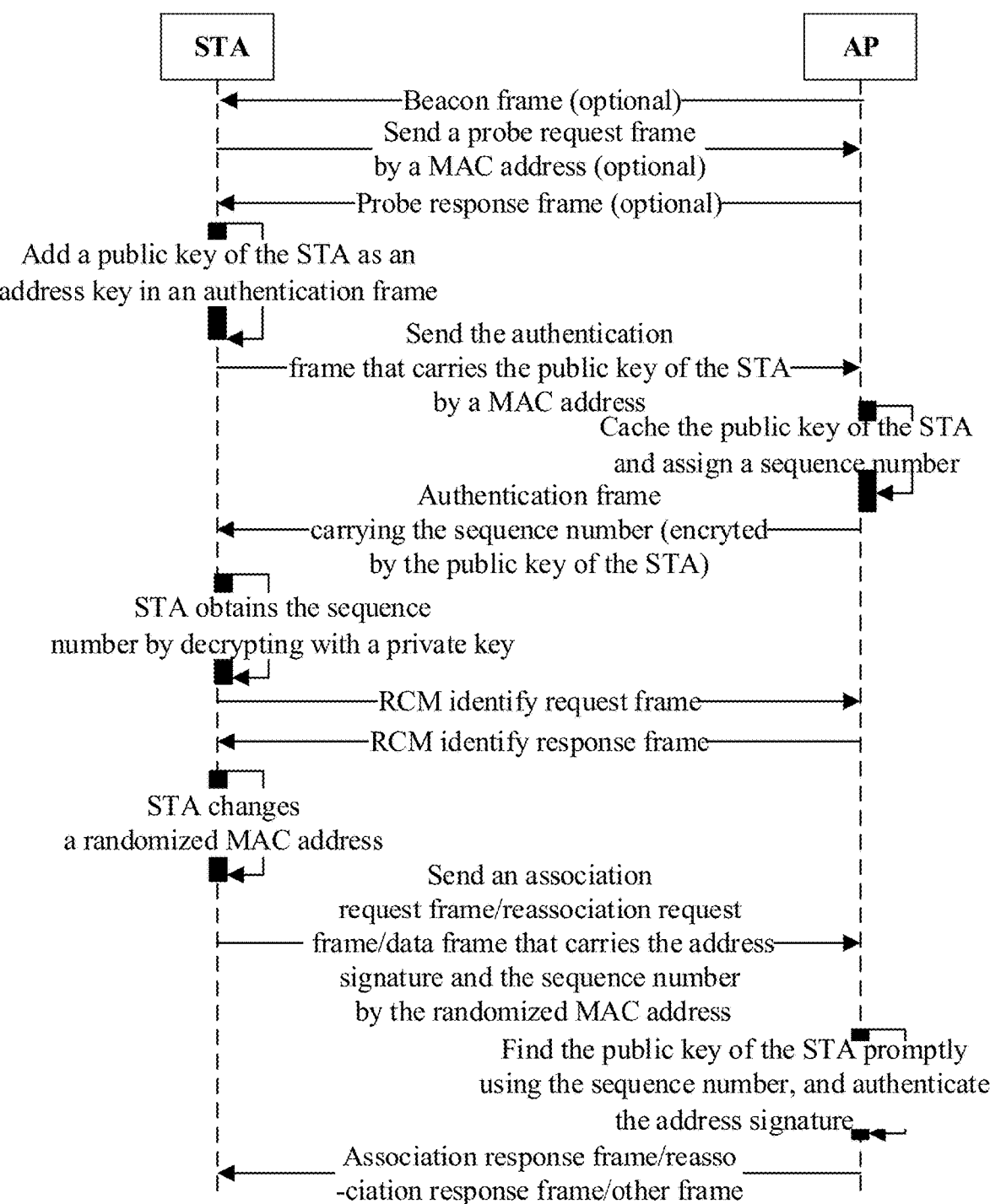
FIG. 26 is a flowchart illustrating a reduction of a complexity of identifying a randomized MAC address in a digital signature mechanism according to an embodiment of the present disclosure.

In summary, a flowchart of the interaction provided in the Embodiment 2 that addresses the problem of brute force testing under the identification of the randomized MAC address using the digital signature may be illustrated in FIG. 26.

The Embodiment 3 is to avoid an attack from the attacker (taking the digital signature identification mechanism as an example). Under the signature mechanism, before the STA changing the randomized MAC address, the STA sends the RCM identify request frame to the AP to request the identity recognition program to be turned on. In response to the AP receiving the request, the AP turns on the program and replies with the RCM identify response frame. When the identity recognition program is turned on, the AP may successfully recognize the legitimate STA that has changed the MAC address. After a period of time, the program is turned off, and the AP may handle a normal association process of the unknown address, but no longer performs the identity recognition on the unknown address, thereby avoiding the malicious launch of identity recognition by the attacker, alleviating a burden on the AP, and avoiding the AP from crashing.

Figure 27:
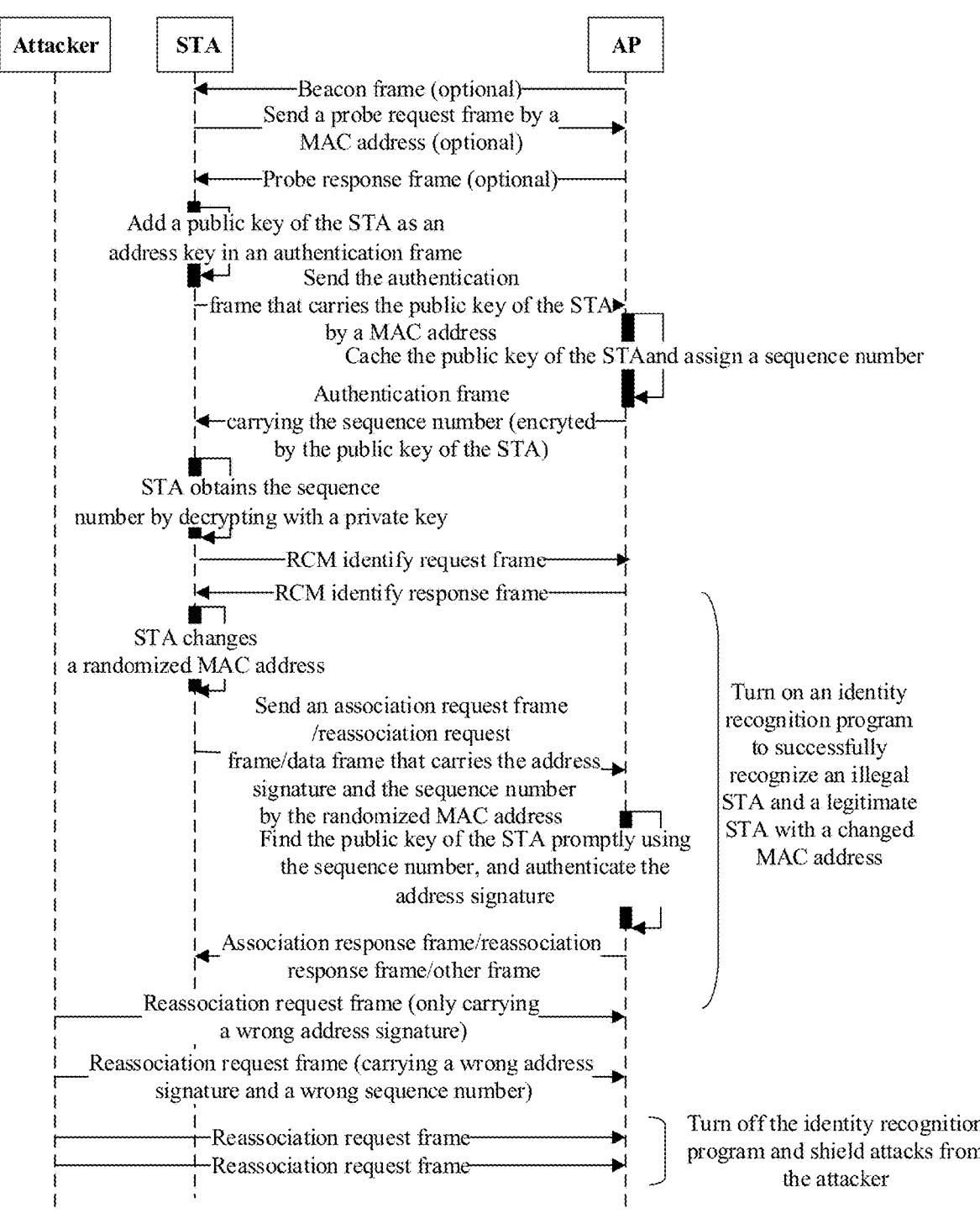
FIG. 27 is a schematic diagram illustrating an AP promptly identifying a legitimate user and an attacker according to an embodiment of the present disclosure.

In the Embodiment 3, specifically as illustrated in FIG. 27, when the legitimate STA sends the RCM identify request frame to the AP, the AP replies with an RCM identify response frame and turns on the identity recognition program.

Under a condition that the identity recognition program is turned on: for the legitimate STA, the legitimate STA sends a frame with RCM to the AP and carries an index sequence number, and the AP finds the corresponding public key through the index sequence number and calculates a signature once, thus the AP identifies the address identity of the legitimate STA and determines the legitimate STA to be a legitimate user.

Under a condition that the identity recognition program is turned on: for the attacker, a frame sent from the attacker belongs to two cases: ① no index sequence number is carried, then the AP directly determines that the attacker is an illegal user; ② an index sequence number (random) is carried, then the AP finds the corresponding public key through the index sequence number, and identifies that the attacker is an illegal user after the AP calculates the signature only once.

In the Embodiment 3, when there is no request from any legitimate STA to start the identity recognition program for a period of time, the program is closed at the end of remaining time, and the AP no longer receives the frame with changing and randomized addresses (i.e., a frame outside of a MAC list of the legitimate user cached by the AP), except for a frame required for the scan process and the authentication process. In response to an attacker that sends an incorrect reassociation request frame (with an incorrect signature) requiring the AP to verify the address identity, the AP determines that the user is an illegal user directly by the MAC address.

Figure 28:
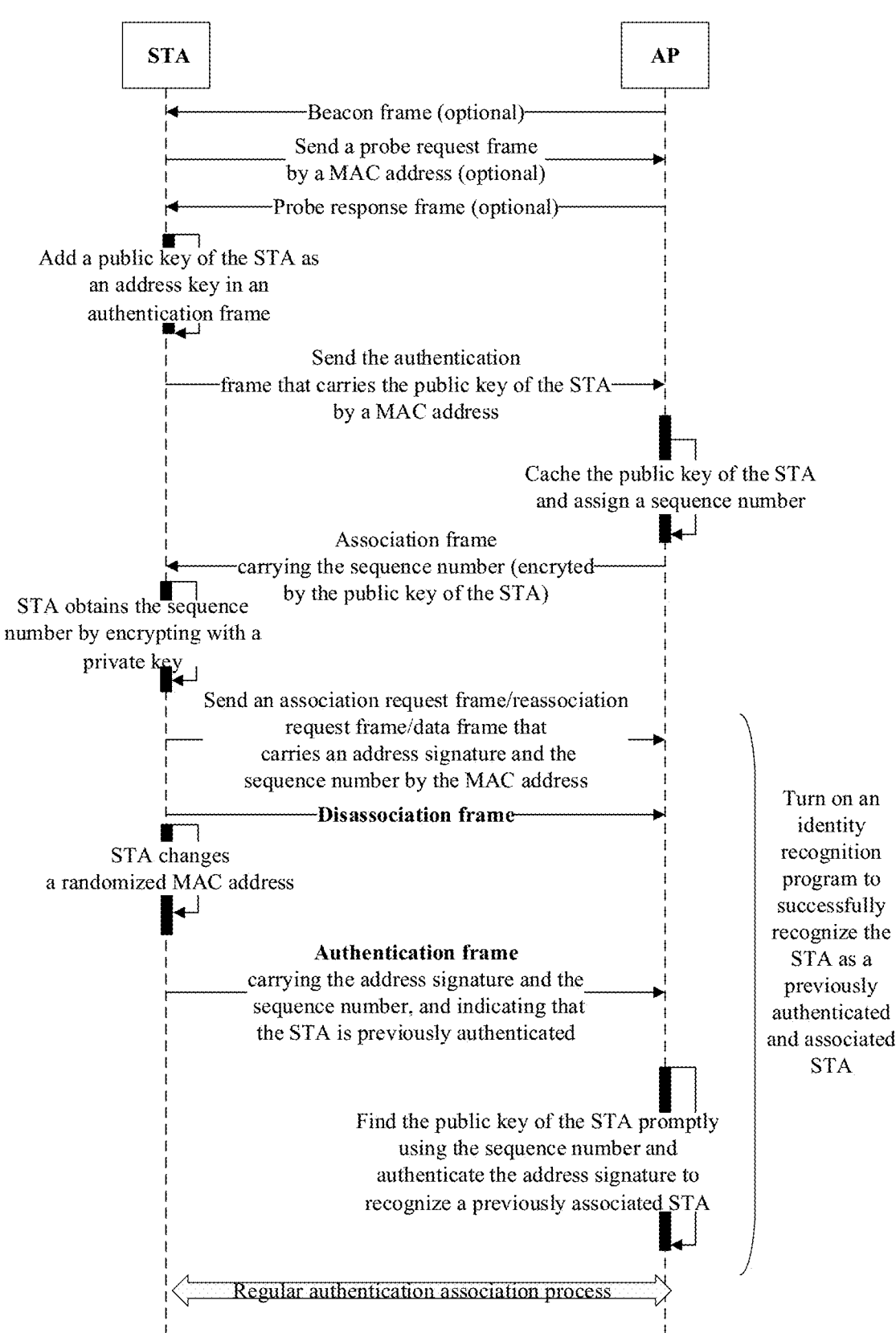
FIG. 28 is a schematic diagram illustrating a MAC address identity recognition process compatible with 802.11aq according to an embodiment of the present disclosure.

The Embodiment 4 is to change a process of randomizing MAC address process to be compatible with 802.11aq. In the 802.11aq protocol, the STA may not change the MAC address after being associated with the AP. When the MAC address needs to be changed, the STA has to be disassociated from the AP, change the MAC address, and then re-associate with the AP. In order to be compatible with the 802.11aq protocol, the present embodiment designs the following process so that the AP is capable of promptly identifying the STA as a previously associated and authenticated STA after the STA is disassociated from the AP, changes the MAC address, and is re-associated the AP. The process is specifically illustrated in FIG. 28.

(1) Before the STA is about to change the MAC address, the STA sends a disassociation frame to the AP as a legitimate STA (keeping the original MAC address), indicating in a reason code that the STA is about to change the MAC address and requesting the AP to turn on the identity recognition program using the disassociation frame. The frame structure of the disassociation frame may be illustrated in the Table 1 above.

(2) In response to the AP receiving the disassociation frame from the STA, the AP disassociates itself from the STA and turns on the identity recognition program.

(3) In response to the STA being disassociated from the AP, the STA may change the MAC address, send the authentication frame that carries the index sequence number to the AP by the new MAC address, and set an indication bit in the authentication frame to indicate that the STA requires the identity recognition.

(4) In response to the AP receiving the identity authentication frame with the identity recognition indication bit, the AP promptly finds a corresponding identity recognition key according to the index sequence number in the frame and verifies the STA address to identify that the STA is one of the previously associated STAs.

(5) In response to the AP identifying the STA, the AP may perform the regular authentication and association process with the STA in accordance with the original 802.11 process without having to interact with the STA again with the information required for the identity recognition process (e.g., assigning the index sequence number, storing the address key and public key, etc.).

Therefore, in the embodiments of the present disclosure, the AP device may obtain a MAC address identity recognition key of the STA device according to the first sequence number, and verify the randomized MAC address according to the MAC address identity recognition key, which allows promptly performing the identity uniqueness recognition on the STA device that adopts the randomized MAC address and avoiding the brute force testing.

Further, in order to reduce the complexity of the identity recognition on the STA device, in the network access phase of the STA device, the AP device may assign a set of sequence numbers for the STA device in advance, where the set of sequence numbers corresponds to the MAC address identity recognition key, and the MAC address identity recognition key of the STA device may be retrieved by the sequence number in the set of sequence numbers, so as to promptly perform the identity recognition on the STA device, and to avoid the brute force testing.

Further, after the AP device assigns the set of sequence numbers, the AP device encrypts the set of sequence numbers through the public key of the STA device and then sends the encrypted set of sequence numbers to the STA device. The sequence numbers of different STA devices may overlap each other. In response to the STA device receiving the set of sequence numbers, the STA device decrypts the set of sequence numbers using the private key thereof. Each time the STA device interacts with the AP device, the STA selects any sequence number from the decrypted set of sequence numbers and carry the sequence number in the communication process. In response to the AP device receiving the sequence number, the AP device retrieves the MAC address identity recognition key according to the sequence number, thereby promptly performing the identity recognition on the STA device. By encrypting the set of sequence numbers, it is possible to prevent eavesdropping when the AP device sends the set of sequence numbers to the STA device. In addition, allowing the sequence numbers of different STA devices to overlap with each other makes it impossible to uniquely locate the STA device by the sequence number, further increasing the difficulty for an eavesdropper to determine the identity of the STA device through the sequence number. Therefore, the user privacy may be further safeguarded while the process complexity of the AP device is reduced.

Further, taking the signature method as an example, even when an attacker that sends an incorrectly re-associated request frame (with an incorrect signature) to the AP device requires the AP device to verify the address identity, the AP device may not be caused to calculate a signature regarding all the public keys. The AP device first determines whether the frame carries a sequence number (when not, it is directly determined to be the attacker by the AP device) and calculates the signature using the public key corresponding to the sequence number. The present solution only needs to calculate the signature at most once so that the attacker may be identified promptly, avoiding the AP device from wasting resources to identify the attacker by brute force.

Further, AP device may be avoided from being crashed by the attacker through adding the identity recognition program launch process. The AP device no longer identifies the unknown address when no legitimate STA changes the MAC address, i.e., when the program is turned off, except for the normal association process, thereby reducing the burden brought about by recognizing the identity of the attacker, and avoiding the AP device from crashing due to the frequent recognition on the attacker.

Figures 29, 30:
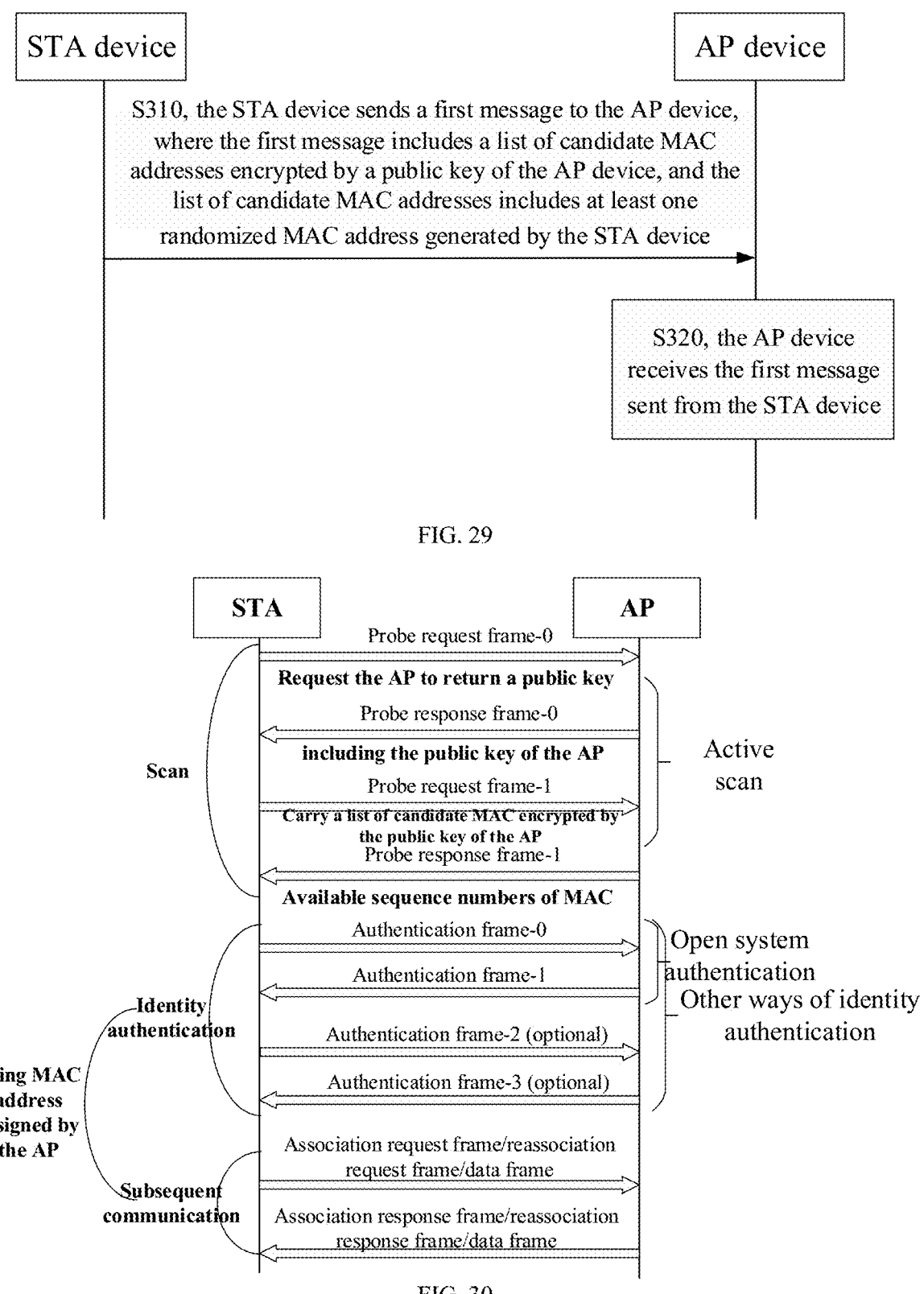
FIG. 29 is a flowchart of another wireless communication method according to an embodiment of the present disclosure.
FIG. 30 is a flowchart illustrating a solution where an AP specifies an available MAC address according to an embodiment of the present disclosure.

FIG. 29 is a flowchart of a wireless communication method 300 according to an embodiment of the present disclosure. As illustrated in FIG. 29, the wireless communication method 300 may include at least some of the following operations.

At operation S310, the STA device sends a first message to the AP device, where the first message includes a list of candidate MAC addresses encrypted by a public key of the AP device, and the list of candidate MAC addresses includes at least one randomized MAC address generated by the STA device.

At operation S320, the AP device receives the first message sent from the STA device.

The AP device needs to cache the MAC address identity recognition key of the STA device in order to identify the STA device that adopts the randomized MAC address, but since more than one STA device may be associated with the AP device at the same time, the AP device may store the MAC address identity recognition keys of more than one STA device. In the embodiments of the present disclosure, the AP device may specify a randomized MAC address to be adopted by the STA device according to the list of candidate MAC addresses, or the AP device may perform the identity uniqueness recognition on the STA device based on the list of candidate MAC addresses. By avoiding the use of the brute force testing method illustrated in FIG. 5 above, an efficiency of the identity uniqueness recognition may be improved and the complexity of the AP device may be reduced.

In some embodiments, the AP device sends a second message to the STA device. The second message includes an identification of a target randomized MAC address, and the target randomized MAC address is a randomized MAC address in the at least one randomized MAC address. The STA device is configured to communicate with the AP device by the randomized MAC address. That is, the AP device may specify a randomized MAC address to be adopted by the STA device according to the list of candidate MAC addresses, and further perform the identity uniqueness recognition on the STA device using the specified randomized MAC address. For example, the first message is sent through a first probe request frame, and the second message is sent through a first probe response frame.

In some embodiments, the STA device communicates with the AP device by the randomized MAC address in the at least one randomized MAC address. That is, the AP device may perform the identity uniqueness recognition on the STA device according to the list of candidate MAC addresses. For example, the first message is sent through the authentication frame.

In some embodiments, the AP device receives a first request message sent from the STA device, and the first request message is configured to request the public key of the AP device; the AP device sends a first response message to the STA device, and the first response message includes the public key of the AP device.

In some embodiments, the first request message is sent through a second probe request frame, and the first response message is sent through a second probe response frame.

In some embodiments, the AP device sends a third message to the STA device, and the third message includes the public key of the AP device. For example, the third message is sent through the beacon frame.

The wireless communication method 300 is described in detail below through Embodiment 5 and Embodiment 6.

In the Embodiment 5, the AP specifies the randomized MAC address available to the STA. The STA generates a list of randomized MAC addresses, and the list of candidate MAC addresses includes at least one randomized MAC address generated by the STA. The randomized MAC address available to the STA is specified by the AP to avoid the brute force testing. As illustrated in FIG. 30, the Embodiment 5 may specifically include the following process.

(1) The STA requests the AP to return the public key of the AP by sending a probe request frame-0.

(2) The AP replies to the STA by sending a probe response frame-0 that carries the public key of the AP.

(3) The STA sends a probe request frame-1 that carries the list of candidate MAC addresses encrypted by the public key of the AP.

(4) The AP decrypts the candidate MAC list using the private key of the AP and specifies the randomized MAC address available to the STA in a probe response frame-1.

(5) The STA communicates with the AP by the randomized MAC address specified by the AP, and the AP may identify the STA through the randomized MAC address of the STA.

Figure 31:
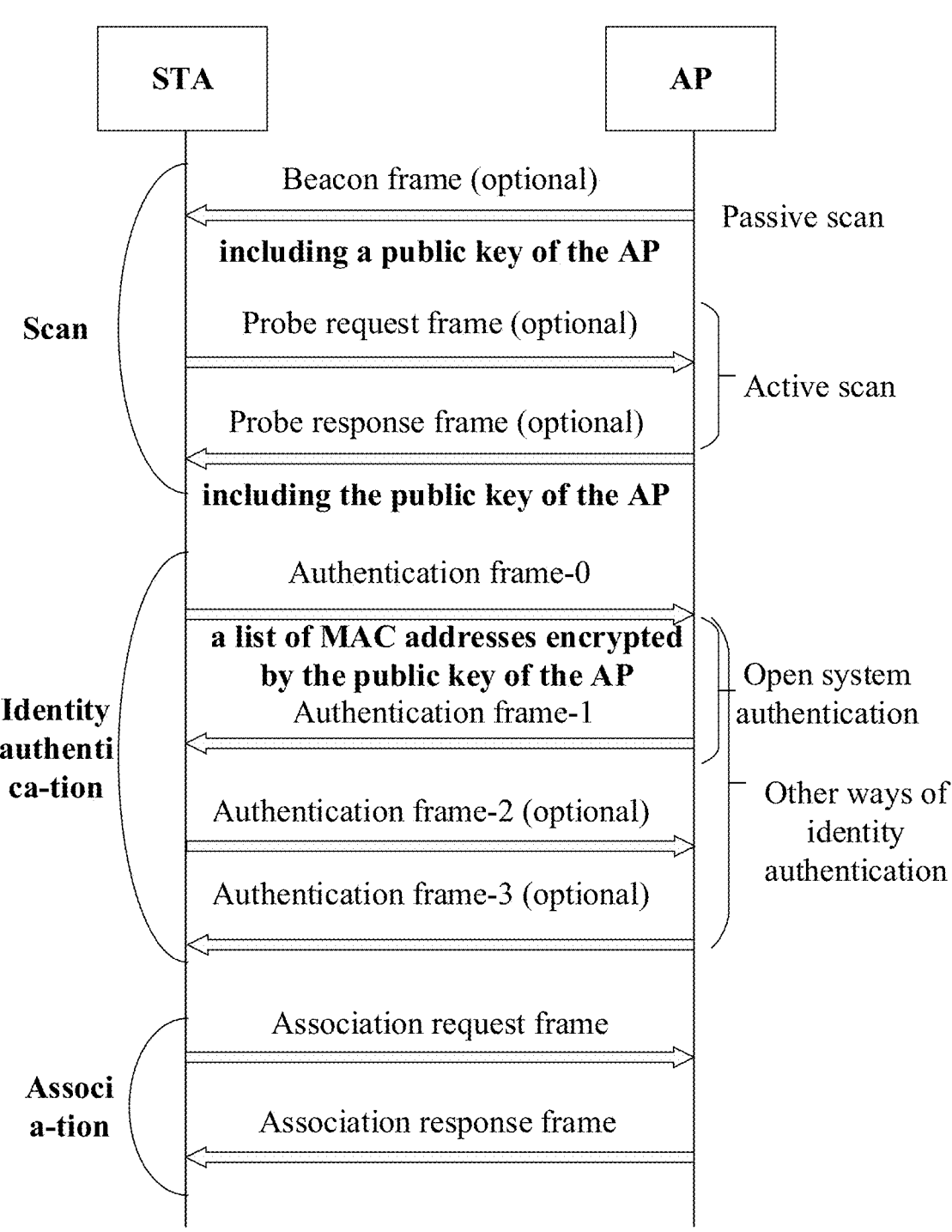
FIG. 31 is a flowchart illustrating a solution where an STA inform an AP of an available MAC address according to an embodiment of the present disclosure.

In the Embodiment 6, the STA informs the AP of the available candidate MAC address. To avoid the brute force testing, the STA may inform the AP of the list of candidate MAC addresses of the STA. The list of candidate MAC addresses includes at least one randomized MAC address generated by the STA so that the AP may identify the identity of the MAC. As illustrated in FIG. 31, the Embodiment 6 may specifically include the following process.

(1) A Scan phase: for a passive scan, the AP carries the public key thereof in the beacon frame; for an active scan, the STA requests the AP to return the public key of the AP by sending the probe request frame, and the AP replies to the STA by sending the probe response frame that carries the public key of the AP.

(2) An identity recognition phase: the STA sends an authentication frame-0 that carries a list of candidate MAC addresses encrypted by the public key of the AP, and the list of candidate MAC addresses includes at least one randomized MAC address generated by the STA.

(3) The AP decrypts the list of candidate MAC addresses of the STA using the private key of the AP and stores the decrypted list of candidate MAC addresses.

(4) The STA communicates with the AP by the randomized MAC address in the list of candidate MAC addresses, and the AP may recognize the STA through the randomized MAC address.

Therefore, in the embodiments of the present disclosure, the STA device informs the AP device of the list of candidate MAC addresses randomized by the STA device, thus the AP device may specify the randomized MAC address adopted by the STA device according to the list of candidate MAC addresses, or the AP device may perform the identity uniqueness recognition on the STA device according to the list of candidate MAC addresses, to avoid the brute force testing.

The embodiments of methods provided in the present disclosure are described in detail above in conjunction with FIG. 6 to FIG. 31. The embodiments of devices provided in the present disclosure are described in detail below in conjunction with FIG. 32 to FIG. 35. The embodiments of the apparatuses correspond to the embodiments of the methods, and similar descriptions in the embodiments of the apparatuses may be referred to the embodiments of the methods.

FIG. 32 is a structural block view of a STA device 400 according to an embodiment of the present disclosure. As illustrated in FIG. 32, the STA device 400 includes the following units.

A communication unit 410 is configured to send a first frame to an AP device by a randomized media access control MAC address that is encrypted or signed.

The first frame is configured to carry a first sequence number, the first sequence number is configured to obtain a MAC address identity recognition key of the STA device by the AP device, and the MAC address identity recognition key is configured to verify the randomized MAC address.

In some embodiments, the first sequence number is a sequence number randomly selected by the STA device from a set of sequence numbers, and the sequence number in the set of sequence numbers corresponds to the MAC address identity recognition key.

In some embodiments, the set of sequence numbers is assigned by the AP device, or the set of sequence numbers is determined by the STA device according to a range of sequence numbers assigned by the AP device.

In some embodiments, the set of sequence numbers includes sequence numbers that are consecutive, or the set of sequence numbers includes sequence numbers that are non-consecutive.

In some embodiments, sequence numbers corresponding to different MAC address identity recognition keys may share at least one sequence number, or sequence numbers corresponding to different MAC address identity recognition keys are different.

In some embodiments, the STA device 400 further includes: a processing unit 420.

The communication unit 410 is further configured to receive the first message sent from the AP device. The first message includes sequence number information encrypted by the public key of the STA device. The sequence number information includes a sequence number in the set of sequence numbers. Alternatively, the sequence number information includes a range of sequence numbers, and the range of sequence numbers includes at least a sequence number in the set of sequence numbers. The sequence number information is assigned by the AP device according to the MAC address identity recognition key, or the sequence number information is assigned by the AP device according to the public key of the STA device.

The processing unit 420 is configured to decrypt the encrypted sequence number information according to the private key of the STA device to obtain the sequence number information; and the processing unit 420 is configured to determine the set of sequence numbers based on the sequence number information.

In some embodiments, the first message is sent through a first authentication frame. The first authentication frame includes a first field, and the first field is configured to indicate the encrypted sequence number information.

In some embodiments, the first field includes n key sequence fields. Each of the n key sequence fields is configured to indicate an encrypted sequence number, and each of the n key sequence fields corresponds to a sequence number in the encrypted sequence number information, where n is a positive integer.

In some embodiments, the first field includes a lower limit field and an upper limit field. The lower limit field is configured to indicate a starting sequence number in the encrypted sequence number information, and the upper limit field is configured to indicate an ending sequence number in the encrypted sequence number information.

In some embodiments, the first authentication frame includes a second field. The second field includes first identification information, second identification information, and third identification information. The first identification information is configured to indicate whether the first field exists, the second identification information is configured to indicate a type of content in the first field, and the third identification information is configured to indicate the number of encrypted sequence numbers indicated by the first field.

In some embodiments, when the second identification information takes a first value, the second identification information is configured to indicate that the first field includes a field that is configured to indicate a value of the encrypted sequence number.

When the second identification information takes a second value, the second identification information is configured to indicate that the first field includes a field that is configured to indicate a range of the encrypted sequence numbers.

In some embodiments, the first field is a key sequence list field and the second field is a key sequence control field. The key sequence list field and the key sequence control field belong to a key sequence information field of the first authentication frame.

In some embodiments, when the STA device sends the first frame to the AP device by the randomized MAC address that is encrypted, the set of sequence numbers is assigned by the AP device according to the MAC address identity recognition key.

In some embodiments, before the STA device receiving the first message sent from the AP device, the communication unit 410 is further configured to send a second message to the AP device. The second message includes the MAC address identity recognition key and a public key of the STA device.

In some embodiments, the second message is sent through a second authentication frame. The second authentication frame includes an identity key field, and the identity key field includes a public key field and an address key field. The public key field is configured to indicate the public key of the STA device, and the address key field is configured to indicate the MAC address identity recognition key.

In some embodiments, when the STA device sends the first frame to the AP device by the randomized MAC address that is signed, the set of sequence numbers is assigned by the AP device according to the public key of the STA device.

In some embodiments, before the STA device receiving the first message sent from the AP device, the communication unit 410 is further configured to send a third message to the AP device, and the third message includes the public key of the STA device.

In some embodiments, the third message is sent through a third authentication frame. The third authentication frame includes an identity key field, and the identity key field includes a public key field. The public key field is configured to indicate the public key of the STA device.

In some embodiments, the first frame is configured to carry first indication information, and the first indication information is configured to indicate that the AP device needs to perform the identity recognition on the STA device.

In some embodiments, before the STA device sending the first frame to the AP device by the randomized MAC address that is encrypted and signed, the communication unit 410 is further configured to send a disassociation frame to the AP device by the MAC address thereof. The disassociation frame is configured to disassociate the STA device from the AP device.

In some embodiments, the disassociation frame includes a third field, and the third field is configured to indicate that the STA device is about to change the MAC address.

In some embodiments, the third field is a reason code field.

In some embodiments, before the STA device sending the first frame to the AP device by the randomized MAC address that is encrypted or signed, the communication unit 410 is further configured to send a fourth message to the AP device by the MAC address thereof. The fourth message is configured to request the AP device to turn on the identity recognition program, or to notify the AP device to turn on the identity recognition program. In response to the AP device turning on the identity recognition program, the AP device verifies the randomized MAC address according to the MAC address identity recognition key.

In some embodiments, the communication unit 410 is further configured to receive a fifth message sent from the AP device, and the fifth message is configured to indicate that the AP device turns on the identity recognition program.

In some embodiments, the fourth message is sent through a second frame. A frame control field of the second frame includes a fourth field, and the fourth field is configured to request the AP device to turn on the identity recognition program, alternatively, the fourth field is configured to notify the AP device to turn on the identity recognition program.

In some embodiments, when the fourth message is configured to request the AP device to turn on the identity recognition program, the second frame is an RCM identify request frame.

Alternatively, when the fourth message is configured to notify the AP device to turn on the identity recognition program, the second frame is a management frame.

In some embodiments, the fifth message is sent through a third frame. The frame control field of the third frame includes a fifth field, and the fifth field is configured to indicate that the AP device turns on the identity recognition program.

In some embodiments, when the fourth message is configured to request the AP device to turn on the identity recognition program, the third frame is an RCM identify response frame.

In some embodiments, after the identity recognition program being turned on for a first period of time, the identity recognition program is turned off.

Alternatively, when no randomized MAC address passes verification within a second period of time after the identity recognition program being turned on, the identity recognition program is turned off.

In some embodiments, the first frame is one of: an association request frame, a reassociation request frame, and a data frame.

In some embodiments, the first frame includes a key sequence field, and the key sequence field is configured to indicate the first sequence number.

In some embodiments, the communication unit described above may be a communication interface or a transceiver, or an input/output interface of a communication chip or a system-on-chip. The processing unit described above may be one or more processors.

The STA device 400 according to the embodiments of the present disclosure may correspond to the STA device in the embodiments of the methods provided in the present disclosure, the above and other operations and/or functions of the various units in the STA device 400 are respectively intended to realize the corresponding process of the STA device in the method 200 illustrated in FIG. 6, and will not be repeated herein for the sake of brevity.

FIG. 33 is a structural block view of an AP device 500 according to an embodiment of the present disclosure. As illustrated in FIG. 33, the AP device 500 includes the following units.

A communication unit 510 is configured to send a first frame by a media access control MAC address that is encrypted or signed. The first frame is configured to carry a first sequence number.

A processing unit 520 is configured to obtain a MAC address identity recognition key of the STA device according to the first sequence number, and verify the randomized MAC address according to the MAC address identity recognition key.

In some embodiments, the first sequence number is a sequence number randomly selected by the STA device from a set of sequence numbers, and the sequence number in the set of sequence numbers corresponds to the MAC address identity recognition key.

In some embodiments, the set of sequence numbers is assigned by the AP device, or the set of sequence numbers is determined by the STA device according to a range of sequence numbers assigned by the AP device.

In some embodiments, the set of sequence numbers includes sequence numbers that are consecutive, or the set of sequence numbers includes sequence numbers that are non-consecutive.

In some embodiments, sequence numbers corresponding to different MAC address identity recognition keys may share at least one sequence number, or sequence numbers corresponding to different MAC address identity recognition keys are different.

In some embodiments, the set of sequence numbers is assigned by the AP device.

The communication unit 510 is further configured to send a first message to the STA device. The first message includes sequence number information encrypted by a public key of the STA device. The sequence number information includes a sequence number in the set of sequence numbers, or the sequence number information includes a range of sequence numbers, and the range of sequence numbers includes at least a sequence number in the set of sequence numbers. The sequence number information is assigned by the AP device according to the MAC address identity recognition key, or the sequence number information is assigned by the AP device according to the public key of the STA device.

In some embodiments, the first message is sent through a first authentication frame. The first authentication frame includes a first field, and the first field is configured to indicate the encrypted sequence number information.

In some embodiments, the first field includes n key sequence fields. Each of the n key sequence fields is configured to indicate an encrypted sequence number, and each of the n key sequence fields corresponds to a sequence number in the encrypted sequence number information, where n is a positive integer.

In some embodiments, the first field includes a lower limit field and an upper limit field. The lower limit field is configured to indicate a starting sequence number in the encrypted sequence number information, and the upper limit field is configured to indicate an ending sequence number in the encrypted sequence number information.

In some embodiments, the first authentication frame includes a second field. The second field includes first identification information, second identification information, and third identification information. The first identification information is configured to indicate whether the first field exists, the second identification information is configured to indicate a type of content in the first field, and the third identification information is configured to indicate the number of encrypted sequence numbers indicated by the first field.

In some embodiments, when the second identification information takes a first value, the second identification information is configured to indicate that the first field includes a field that is configured to indicate a value of the encrypted sequence number.

When the second identification information takes a second value, the second identification information is configured to indicate that the first field includes a field that is configured to indicate a range of the encrypted sequence numbers.

In some embodiments, the first field is a key sequence list field and the second field is a key sequence control field. The key sequence list field and the key sequence control field belong to a key sequence information field of the first authentication frame.

In some embodiments, when the STA device sends the first frame to the AP device by the randomized MAC address that is encrypted, the set of sequence numbers is assigned by the AP device according to the MAC address identity recognition key.

In some embodiments, before the AP device sending the first message to the STA device, the communication unit 510 is further configured to receive a second message sent from the AP device. The second message includes the MAC address identity recognition key and a public key of the STA device.

In some embodiments, the second message is sent through a second authentication frame. The second authentication frame includes an identity key field, and the identity key field includes a public key field and an address key field. The public key field is configured to indicate the public key of the STA device, and the address key field is configured to indicate the MAC address identity recognition key.

In some embodiments, when the STA device sends the first frame to the AP device by the randomized MAC address that is signed, the set of sequence numbers is assigned by the AP device according to the public key of the STA device.

In some embodiments, before the AP device sending the first message to the STA device, the communication unit 510 is further configured to receive a third message sent from the STA device, and the third message includes the public key of the STA device.

In some embodiments, the third message is sent through a third authentication frame. The third authentication frame includes an identity key field, and the identity key field includes a public key field. The public key field is configured to indicate the public key of the STA device.

In some embodiments, the first frame is configured to carry first indication information, and the first indication information is configured to indicate that the AP device needs to perform the identity recognition on the STA device.

In some embodiments, before the AP device receiving the first frame sent from the STA device by the MAC address encrypted or signed by the STA device, the communication unit 510 is further configured to receive a disassociation frame sent from the STA device by the MAC address of the STA device. The disassociation frame is configured to disassociate the STA device from the AP device.

In some embodiments, the disassociation frame includes a third field, and the third field is configured to indicate that the STA device is about to change the MAC address.

In some embodiments, the third field is a reason code field.

In some embodiments, the processing unit 520 is further configured to turn on the identity recognition program. In response to the processing unit 520 turning on the identity recognition program, the AP device verifies the randomized MAC address according to the MAC address identity recognition key.

In some embodiments, before the AP device receiving the first frame sent from the STA device by the MAC address that is encrypted or signed, the communication unit 510 is further configured to receive a fourth message sent from the STA device by the MAC address of the STA device. The fourth message is configured to request the AP device to turn on the identity recognition program, or to notify the AP device to turn on the identity recognition program. In response to the processing unit 520 turning on the identity recognition program, the AP device verifies the randomized MAC address according to the MAC address identity recognition key.

In some embodiments, the communication unit 510 is further configured to send a fifth message to the STA device, and the fifth message is configured to indicate that the AP device turns on the identity recognition program.

In some embodiments, the fourth message is sent through a second frame. A frame control field of the second frame includes a fourth field, and the fourth field is configured to request the AP device to turn on the identity recognition program, alternatively, the fourth field is configured to notify the AP device to turn on the identity recognition program.

In some embodiments, when the fourth message is configured to request the AP device to turn on the identity recognition program, the second frame is an RCM identify request frame.

Alternatively, when the fourth message is configured to notify the AP device to turn on the identity recognition program, the second frame is a management frame.

In some embodiments, the fifth message is sent through a third frame. The frame control field of the third frame includes a fifth field, and the fifth field is configured to indicate that the AP device turns on the identity recognition program.

In some embodiments, when the fourth message is configured to request the AP device to turn on the identity recognition program, the third frame is an RCM identify response frame.

In some embodiments, the processing unit 520 is further configured to turn off the identity recognition program after the identity recognition program being turned on for a first period of time. Alternatively, the processing unit 520 is further configured to turn off the identity recognition program when no randomized MAC address passes verification within a second period of time after the identity recognition program being turned on.

In some embodiments, the first frame is one of: an association request frame, a reassociation request frame, and a data frame.

In some embodiments, the first frame includes a key sequence field, and the key sequence field is configured to indicate the first sequence number.

In some embodiments, the communication unit described above may be a communication interface or a transceiver, or an input/output interface of a communication chip or a system-on-chip. The processing unit described above may be one or more processors.

The AP device 500 according to the embodiments of the present disclosure may correspond to the AP device in the embodiments of the methods provided in the present disclosure, the above and other operations and/or functions of the various units in the AP device 500 are respectively intended to realize the corresponding process of the AP device in the method 200 illustrated in FIG. 6, and will not be repeated herein for the sake of brevity.

FIG. 34 is a structural block view of a STA device 600 according to an embodiment of the present disclosure. As illustrated in FIG. 34, the STA device 600 includes the following units.

A communication unit 610 is configured to send a first message to an AP device.

The first message includes a list of candidate media access control MAC addresses encrypted by a public key of the AP device, and the list of candidate MAC addresses includes at least one randomized MAC address generated by the STA device.

In some embodiments, the communication unit 610 is further configured to receive a second message sent from the AP device. The second message includes an identification of a target randomized MAC address, and the target randomized MAC address is a randomized MAC address in the at least one randomized MAC address.

The communication unit 610 is further configured to communicate with the AP device by the target randomized MAC address.

In some embodiments, the first message is sent through a first probe request frame, and the second message is sent through a first probe response frame.

In some embodiments, the communication unit 610 is further configured to communicate with the AP device by a randomized MAC address in the at least one randomized MAC address.

In some embodiments, the first message is sent through an authentication frame.

In some embodiments, the communication unit 610 is further configured to send a first request message to the AP device, and the first request message is configured to request a public key of the AP device.

The communication unit 610 is further configured to receive a first response message sent from the AP device, and the first response message includes the public key of the AP device.

In some embodiments, the first request message is sent through a second probe request frame, and the first response message is sent through a second probe response frame.

In some embodiments, the communication unit 610 is further configured to receive a third message sent from the AP device, and the third message includes the public key of the AP device.

In some embodiments, the third message is sent through a beacon frame.

In some embodiments, the communication unit described above may be a communication interface or a transceiver, or an input/output interface of a communication chip or a system-on-chip.

The STA device 600 according to the embodiments of the present disclosure may correspond to the STA device in the embodiments of the methods provided in the present disclosure, the above and other operations and/or functions of the various units in the STA device 600 are respectively intended to realize the corresponding process of the STA device in the method 300 illustrated in FIG. 29, and will not be repeated herein for the sake of brevity.

Figure 35:
FIG. 35 is a structural block view of another AP device according to an embodiment of the present disclosure.

FIG. 35 is a structural block view of an AP device 700 according to an embodiment of the present disclosure. As illustrated in FIG. 35, the AP device 700 includes the following units.

A communication unit 710 is configured to receive a first message sent from the STA device.

The first message includes a list of media access control MAC addresses encrypted by a public key of the AP device, and the list of candidate MAC addresses includes at least one randomized MAC address generated by the STA device.

In some embodiments, the AP device sends a second message to the STA device, the second message includes an identification of a target randomized MAC address, the target randomized MAC address is a randomized MAC address in the at least one randomized MAC address, which is used by the STA device to communicate with the AP device.

In some embodiments, the first message is sent through a first probe request frame, and the second message is sent through a first probe response frame.

In some embodiments, the communication unit 710 is further configured to communicate with the AP device by a randomized MAC address in the at least one randomized MAC address.

In some embodiments, the first message is sent through an authentication frame.

In some embodiments, the communication unit 710 is further configured to receive a first request message sent from the STA device, and the first request message is configured to request a public key of the AP device.

The communication unit 710 is further configured to send a first response message to the STA device, and the first response message includes the public key of the AP device.

In some embodiments, the first request message is sent through a second probe request frame, and the first response message is sent through a second probe response frame.

In some embodiments, the communication unit 710 is further configured to send a third message to the STA device, and the third message includes the public key of the AP device.

In some embodiments, the third message is sent through a beacon frame.

In some embodiments, the communication unit described above may be a communication interface or a transceiver, or an input/output interface of a communication chip or a system-on-chip. The processing unit described above may be one or more processors.

The AP device 700 according to the embodiments of the present disclosure may correspond to the AP device in the embodiments of the methods provided in the present disclosure, the above and other operations and/or functions of the various units in the AP device 700 are respectively intended to realize the corresponding process of the AP device in the method 300 illustrated in FIG. 29, and will not be repeated herein for the sake of brevity.

Figure 36:
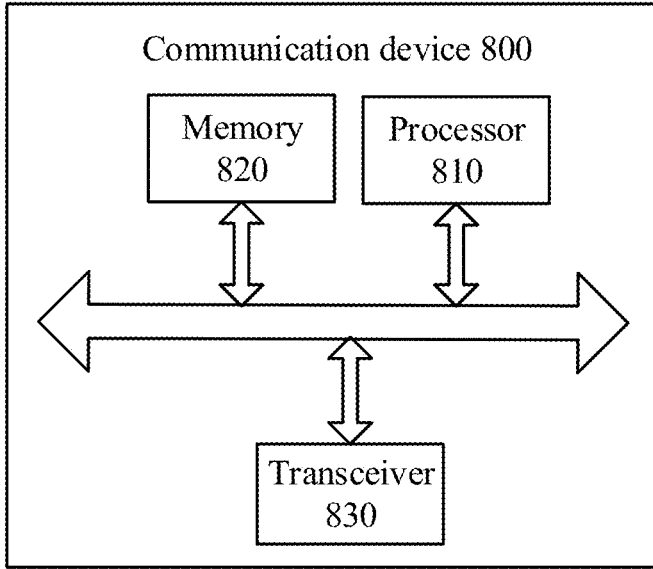
FIG. 36 is a structural block view of a communication device according to an embodiment of the present disclosure.

FIG. 36 is a structural block view of a communication device 800 according to an embodiment of the present disclosure. The communication device 800 illustrated in FIG. 36 includes a processor 810, and the processor 810 may call and run a computer program from a memory to realize the methods in the embodiments of the present disclosure.

In some embodiments, as illustrated in FIG. 36, the communication device 800 may further include a memory 820, and the processor 810 may call and run a computer program from the memory 820 to realize the methods in the embodiments of the present disclosure.

The memory 820 may be a device that is separate to the processor 810 or may be integrated into the processor 810.

In some embodiments, as illustrated in FIG. 36, the communication device 800 may further include a transceiver 830. The processor 810 may control the transceiver 830 to communicate with other devices, specifically, to send information or data to the other devices or to receive information or data sent from the other devices.

The transceiver 830 may include a transmitter and a receiver. The transceiver 830 may further include an antenna, and the number of antennas may be one or more.

In some embodiments, the communication device 800 may specifically be an AP device provided in the embodiments of the present disclosure, and the communication device 800 may realize the corresponding process realized by the AP device in the various methods provided in the embodiments of the present disclosure, which will not be repeated herein for the sake of brevity.

In some embodiments, the communication device 800 may specifically be a STA device provided in the embodiments of the present disclosure, and the communication device 800 may realize the corresponding process realized by the STA device in various methods provided in the embodiments of the present disclosure, which will not be repeated herein for the sake of brevity.

Figure 37:
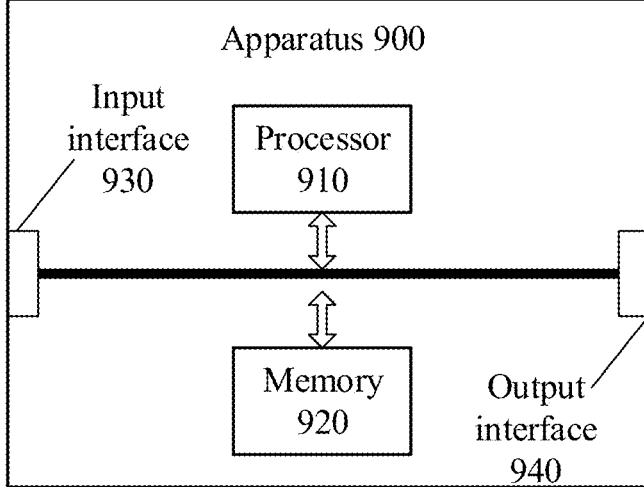
FIG. 37 is a structural block view of an apparatus according to an embodiment of the present disclosure.

FIG. 37 is a structural block view of an apparatus according to an embodiment of the present disclosure. The apparatus 900 illustrated in FIG. 37 includes a processor 910, and the processor 901 may call and run a computer program from a memory to realize the methods in the embodiments of the present disclosure.

In some embodiments, as illustrated in FIG. 37, the apparatus 900 may further include a memory 920. and the processor 910 may call and run a computer program from the memory 920 to realize the methods in the embodiments of the present disclosure.

The memory 920 may be a device that is separate to the processor 910 or may be integrated into the processor 910.

In some embodiments, the apparatus 900 may further include an input interface 930. The processor 910 may control the input interface 930 to communicate with other devices or chips, specifically, to obtain information or data sent from the other devices or chips.

In some embodiments, the apparatus 900 may further include an output interface 940. The processor 910 may control the output interface 940 to communicate with other devices or chips, specifically, to output information or data to the other devices or chips.

In some embodiments, the apparatus may be applied to the AP device in the embodiments of the present disclosure, and the apparatus may realize the corresponding process realized by the AP device in the various methods provided in the embodiments of the present disclosure, which will not be repeated herein for the sake of brevity.

In some embodiments, the apparatus may be applied to the STA device in the embodiments of the present disclosure, and the apparatus may realize the corresponding process realized by the STA device in the various methods provided in the embodiments of the present disclosure, which will not be repeated herein for the sake of brevity.

In some embodiments, the apparatus referred to in the embodiments of the present disclosure may further be a chip. For example, the apparatus may be a system-on-chip, and etc.

Figure 38:
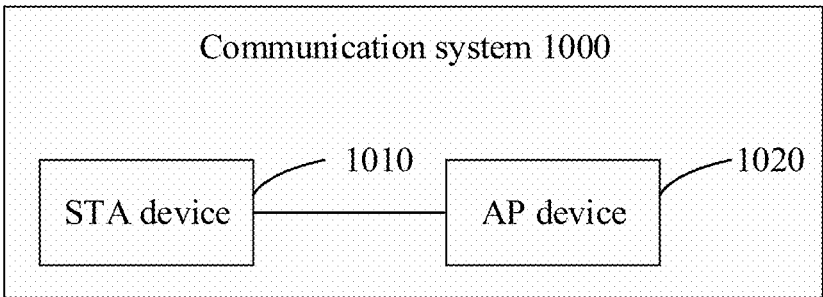
FIG. 38 is a structural block view of a communication system according to an embodiment of the present disclosure.

FIG. 38 is a structural block view of a communication system 20 according to an embodiment of the present disclosure. As illustrated in FIG. 38, the communication system 1000 includes a STA device 1010 and an AP device 1020.

The STA device 1010 may be configured to realize corresponding functions realized by the STA device in the methods described above, and the AP device 1020 may be configured to realized corresponding functions realized by the AP device in the methods described above, which will not be repeated herein for the sake of brevity.

The processor in the embodiments of the present disclosure may be an integrated circuit chip with signal processing capabilities. In realization, the operations in the embodiments of methods above may be performed by an integrated logic circuit in a form of hardware in the processor or by an instruction in a form of software. The above-described processor may be a general purpose processor, a digital signal processor (DSP), an application specific integrated circuit (ASIC), a field programmable gate array (FPGA) or other programmable logic devices, a discrete gate or transistor logic device, and a discrete hardware component, which may realize or perform various methods, operations, and logic block views provided in the embodiments of the present disclosure. The general purpose processor may be a microprocessor or any regular processor, etc. The operations of the methods disclosed in conjunction with the embodiments of the present disclosure may be directly performed through a hardware of a decoding processor, or may be performed through a combination of hardware and software modules in the decoding processor. The software modules may be located in a random access memory, a flash memory, a read-only memory, a programmable read-only memory or an electrically erasable programmable memory, a register, and any other storage mediums that is well established in the art. The storage medium is located in the memory. The processor reads the information in the memory and performs the operations of the methods described above in conjunction with the hardware thereof.

The memory in the embodiments of the present disclosure may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), which is configured to be an external cache. By way of illustration, but not limitation, many forms of the RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SL-DRAM), and a direct rambus RAM (DR RAM). The memory of the systems and the methods described herein is intended to include, but is not limited to, the memories above and any other suitable types of memory.

The above memories are merely examples instead of restrictive descriptions. For example, the memories in the embodiments of the present disclosure may further be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM), and so on. That is, the memories in the embodiments of the present disclosure is intended to include, but is not limited to, the memories above and any other suitable types of memory.

The embodiments of the present disclosure further provide a computer-readable storage medium, and the computer-readable storage medium is configured to store a computer program.

In some embodiments, the computer-readable storage medium may be applied to the AP device in the embodiments of the present disclosure, and the computer program causes the computer to perform the corresponding process realized by the AP device in the various methods in the embodiments of the present disclosure, which will not be repeated herein for the sake of brevity.

In some embodiments, the computer-readable storage medium may be applied to the STA device in the embodiments of the present disclosure, and the computer program causes the computer to perform the corresponding processes realized by the STA device in the various methods in the embodiments of the present disclosure, which will not be repeated herein for the sake of brevity.

The embodiments of the present disclosure further provide a computer program product, and the computer program product includes a computer program instruction.

In some embodiments, the computer program product may be applied to the AP device in the embodiments of the present disclosure, and the computer program instructions cause the computer to perform the corresponding process realized by the AP device in the various methods in the embodiments of the present disclosure, which will not be repeated herein for the sake of brevity.

In some embodiments, the computer program product may be applied to the STA device in the embodiments of the present disclosure, and the computer program instructions cause the computer to perform the corresponding process realized by the STA device in the various methods in the embodiments of the present disclosure, which will not be repeated herein for the sake of brevity.

The embodiments of the present disclosure further provide a computer program.

In some embodiments, the computer program may be applied to the AP device in the embodiments of the present disclosure, and when the computer program is run on the computer, the computer is caused by the computer program to perform the corresponding process realized by the AP device in the various methods in the embodiments of the present disclosure, which will not be repeated herein for the sake of brevity.

In some embodiments, the computer program may be applied to the STA device in the embodiments of the present disclosure, and when the computer program is run on a computer, the computer is caused by the computer program to perform the corresponding process realized by the STA device in the various methods in the embodiments of the present disclosure, which will not be repeated herein for the sake of brevity.

An ordinary skilled in the art may realize that the units and algorithmic operations described in conjunction with the various examples of the embodiments disclosed herein may be realized in an electronic hardware, or a combination of a computer software and the electronic hardware. Whether the functions are performed in the hardware or the software depends on a particular application and a design constraint of a technical solution. The ordinary skilled in the art may use different methods to realize the described functions for each particular application, but such implementations may not be considered outside the scope of the present disclosure.

The ordinary skilled in the art may clearly understand that, for the convenience and brevity of the description, the specific operation process of the above-described systems, apparatuses, and units may be referred to the corresponding process in the aforementioned embodiments of the methods, which will not be repeated herein.

In the embodiments of the present disclosure, the systems, the apparatuses and the methods may be realized in other ways. For example, the above-described embodiments of the apparatuses are merely illustrative, e.g., a division of the described units, which is merely a logical functional division and may be divided in other ways in real implementations. For example, multiple units or components may be combined or may be integrated into another system, some features may be ignored, or some features may not be implemented. Besides, a coupling or a direct coupling or a communication connection between each other, as illustrated or discussed, may be an indirect coupling or a communication connection through some interfaces, apparatuses or units, which may be electrical, mechanical or otherwise.

The units illustrated as separated components may or may not be physically separated, and the components illustrated as units may or may not be physical units, i.e., they may be located in a single place or may be distributed over many network units. Some or all of the units may be selected to achieve the purpose of the embodiments according to actual needs.

In addition, the functional units in the various embodiments of the present disclosure may be integrated in a single processing unit, or each may be physically present separately, or two or more units may be integrated in a single unit.

The functions may be stored in a computer-readable storage medium when the functions are realized as a software functional unit and sold or used as an individual product. It is thus understood that the technical solutions of the present disclosure in essence, or a part of the technical solutions that contributes to the prior art, or a part of the technical solutions, may be presented in the form of a software product. The computer software product is stored in a storage medium and includes several instructions. A computer device (which may be a personal computer, a server, or an AP device, etc.) may be caused by the instructions to perform all or some of the operations in the methods described in the various embodiments of the present disclosure. The aforementioned storage medium includes a USB flash drive, a portable hard disk, a read-only memory (ROM), a random access memory (RAM), a diskette or a CD-ROM, and any other medium that may store program code.

Above is only a specific implementation of the present disclosure, but the scope of protection of the present disclosure is not limited thereto. Any changes or substitutions that falls within the technical scope disclosed in the present disclosure and may be easily come up by the ordinary skilled in the art are covered by the scope of the protection of the present disclosure. Therefore, the scope of protection of the present disclosure shall refer to the scope of protection of the claims.

What is claimed is:

1. A wireless communication method, comprising:

sending, by a station (STA) device, a first frame by a randomized media access control (MAC) address to an access point (AP) device;

wherein the first frame is configured to carry a first sequence number; the first sequence number is configured to obtain a MAC address identity recognition key of the STA device by the AP device; and the MAC address identity recognition key is configured to verify the randomized MAC address;

wherein the first sequence number is a sequence number randomly selected by the STA device from a set of sequence numbers;

wherein the method further comprises:

receiving, by the STA device, a first message sent from the AP device; wherein the first message comprises sequence number information; and the sequence number information comprises a sequence number in the set of sequence numbers, or the sequence number information comprises a range of sequence numbers, and the range of sequence numbers comprises at least a sequence number in the set of sequence numbers;

wherein the first message is sent through a first authentication frame; and the first authentication frame comprises a first field, and the first field is configured to indicate the sequence number information;

wherein the first field comprises n key sequence fields; each of the n key sequence fields is configured to indicate a sequence number; each of the n key sequence fields corresponds to a sequence number in the sequence number information; and n is a positive integer; or the first field comprises a lower limit field and an upper limit field; the lower limit field is configured to indicate a starting sequence number in the sequence number information; and the upper limit field is configured to indicate an ending sequence number in the sequence number information.

2. A station (STA) device, comprising a processor and a memory, wherein the memory is configured to store a computer program; when the computer program stored in the memory is called and run by the processor, the processor is caused to perform a wireless communication method and the method comprises:

sending, by the STA device, a first frame by a randomized media access control (MAC) address to an access point (AP) device;

wherein the first frame is configured to carry a first sequence number; the first sequence number is configured to obtain a MAC address identity recognition key of the STA device by the AP device; and the MAC address identity recognition key is configured to verify the randomized MAC address;

wherein the first sequence number is a sequence number randomly selected by the STA device from a set of sequence numbers;

wherein the method further comprises:

receiving, by the STA device, a first message sent from the AP device; wherein the first message comprises sequence number information; and the sequence number information comprises a sequence number in the set of sequence numbers, or the sequence number information comprises a range of sequence numbers, and the range of sequence numbers comprises at least a sequence number in the set of sequence numbers;

wherein the first message is sent through a first authentication frame; and the first authentication frame comprises a first field, and the first field is configured to indicate the sequence number information;

wherein the first field comprises n key sequence fields; each of the n key sequence fields is configured to indicate a sequence number; each of the n key sequence fields corresponds to a sequence number in the sequence number information; and n is a positive integer; or the first field comprises a lower limit field and an upper limit field; the lower limit field is configured to indicate a starting sequence number in the sequence number information; and the upper limit field is configured to indicate an ending sequence number in the sequence number information.

3. The STA device as claimed in claim 2, wherein the sequence number in the set of sequence numbers corresponds to the MAC address identity recognition key of the STA device; the set of sequence numbers comprises consecutive sequence numbers, or the set of sequence numbers comprises non-consecutive sequence numbers; sequence numbers corresponding to different MAC address identity recognition keys share at least one sequence number, or sequence numbers corresponding to different MAC address identity recognition keys are different.

4. The STA device as claimed in claim 2, wherein the first authentication frame comprises a second field; the second field comprises first identification information, second identification information, and third identification information; and the first identification information is configured to indicate whether the first field exists, the second identification information is configured to indicate a type of content in the first field, and the third identification information is configured to indicate the number of sequence numbers indicated by the first field; wherein in response to the second identification information taking a first value, the second identification information is configured to indicate that the first field comprises a field that is configured to indicate a value of the sequence number; and in response to the second identification information taking a second value, the second identification information is configured to indicate that the first field comprises a field that is configured to indicate a range of the sequence numbers.

5. The STA device as claimed in claim 4, wherein the first field is a key sequence list field, and the second field is a key sequence control field; and the key sequence list field and the key sequence control field belong to a key sequence information field of the first authentication frame.

6. The STA device as claimed in claim 2, wherein the set of sequence numbers is assigned by the AP device according to the MAC address identity recognition key of the STA device;

wherein before the receiving, by the STA device, a first message sent from the AP device, the method further comprises:

sending, by the STA device, a second message to the AP device; wherein the second message comprises the MAC address identity recognition key and a public key of the STA device;

wherein the second message is sent through a second authentication frame; the second authentication frame comprises an identity key field, and the identity key field comprises a public key field and an address key field; the public key field is configured to indicate the public key of the STA device, and the address key field is configured to indicate the MAC address identity recognition key.

7. The STA device as claimed in claim 2, wherein in response to the STA device sending the first frame to the AP device by the randomized MAC address, the set of sequence numbers is assigned by the AP device according to a public key of the STA device;

wherein before the receiving, by the STA device, a first message sent from the AP device, the method further comprises:

sending, by the STA device, a third message to the AP device; wherein the third message comprises the public key of the STA device;

the third message is sent through a third authentication frame; the third authentication frame comprises an identity key field, and the identity key field comprises a public key field; and the public key field is configured to indicate the public key of the STA device.

8. The STA device as claimed in claim 2, wherein the first frame is configured to carry first indication information, and the first indication information is configured to indicate that the AP device needs to perform identity recognition on the STA device;

wherein before the sending, by a STA device, a first frame by a randomized MAC address to an AP device, the method further comprises:

sending, by the STA device, a disassociation frame by a MAC address of the STA device to the AP device; wherein the disassociation frame is configured to disassociate the STA device from the AP device; the disassociation frame comprises a third field, and the third field is configured to indicate that the STA device is about to change the MAC address;

and the third field is a reason code field.

9. The STA device as claimed in claim 2, wherein before the sending, by a STA device, a first frame by a randomized MAC address to an AP device, the method further comprises:

sending, by the STA device, a fourth message by a MAC address of the STA device to the AP device; wherein the fourth message is configured to request the AP device to turn on an identity recognition program, or the fourth message is configured to notify the AP device to turn on an identity recognition program;

wherein in response to the AP device turning on the identity recognition program, the AP device verifies the randomized MAC address according to the MAC address identity recognition key.

10. The STA device as claimed in claim 9, wherein the STA device receives a fifth message sent from the AP device, and the fifth message is configured to indicate that the AP device turns on the identity recognition program; the fifth message is sent through a third frame; a frame control field of the third frame comprises a fifth field, and the fifth field is configured to indicate that the AP device turns on the identity recognition program; wherein in a case where the fourth message is configured to request the AP device to turn on the identity recognition program, the third frame is a randomized and changing MAC address (RCM) identify response frame.

11. The STA device as claimed in claim 9, wherein the fourth message is sent through a second frame; a frame control field of the second frame comprises a fourth field; and the fourth field is configured to request the AP device to turn on the identity recognition program, or the fourth field is configured to notify the AP device to turn on the identity recognition program; wherein in a case where the fourth message is configured to request the AP device to turn on the identity recognition program, the second frame is a RCM identify request frame; or in a case where the fourth message is configured to notify the AP device to turn on the identity recognition program, the second frame is a management frame.

12. The STA device as claimed in claim 10, wherein the method further comprises:

in response to the AP device turning on the identity recognition program for a first period of time, the AP device turns off the identity recognition program; or in response to no randomized MAC address passing verification within a second period of time after the AP device turning on the identity recognition program, the AP device turns off the identity recognition program.

13. The STA device as claimed in claim 2, wherein the first frame is one of: an association request frame, a reassociation request frame, and a data frame; and the first frame comprises a key sequence field, and the key sequence field is configured to indicate the first sequence number.

14. An access point (AP) device, comprising a processor and a memory, wherein the memory is configured to store a computer program; when the computer program stored in the memory is called and run by the processor, the processor is caused to perform a wireless communication method and the method comprises:

receiving, by the AP device, a first frame sent from a station (STA) device by a randomized media access control (MAC) address; wherein the first frame is configured to carry a first sequence number;

obtaining, by the AP device, a MAC address identity recognition key of the STA device according to the first sequence number; and verifying, by the AP device, the randomized MAC address according to the MAC address identity recognition key;

wherein the first sequence number is a sequence number randomly selected by the STA device from a set of sequence numbers;

wherein the method further comprises:

sending, by the AP device, a first message to the STA device; wherein the first message comprises sequence number information; and the sequence number information comprises a sequence number in the set of sequence numbers, or the sequence number information comprises a range of sequence numbers, and the range of sequence numbers comprises at least a sequence number in the set of sequence numbers;

wherein the first message is sent through a first authentication frame; and the first authentication frame comprises a first field, and the first field is configured to indicate the sequence number information;

wherein the first field comprises n key sequence fields; each of the n key sequence fields is configured to indicate a sequence number; each of the n key sequence fields corresponds to a sequence number in the sequence number information; and n is a positive integer; or the first field comprises a lower limit field and an upper limit field; the lower limit field is configured to indicate a starting sequence number in the sequence number information; and the upper limit field is configured to indicate an ending sequence number in the sequence number information.

15. The wireless communication method as claimed in claim 1, wherein the sequence number in the set of sequence numbers corresponds to the MAC address identity recognition key of the STA device; the set of sequence numbers comprises consecutive sequence numbers, or the set of sequence numbers comprises non-consecutive sequence numbers; sequence numbers corresponding to different MAC address identity recognition keys share at least one sequence number, or sequence numbers corresponding to different MAC address identity recognition keys are different.

16. The wireless communication method as claimed in claim 1, wherein the first authentication frame comprises a second field; the second field comprises first identification information, second identification information, and third identification information; and the first identification information is configured to indicate whether the first field exists, the second identification information is configured to indicate a type of content in the first field, and the third identification information is configured to indicate the number of sequence numbers indicated by the first field; wherein in response to the second identification information taking a first value, the second identification information is configured to indicate that the first field comprises a field that is configured to indicate a value of the sequence number; and in response to the second identification information taking a second value, the second identification information is configured to indicate that the first field comprises a field that is configured to indicate a range of the sequence numbers.

17. The wireless communication method as claimed in claim 16, wherein the first field is a key sequence list field, and the second field is a key sequence control field; and the key sequence list field and the key sequence control field belong to a key sequence information field of the first authentication frame.

18. The wireless communication method as claimed in claim 1, wherein the set of sequence numbers is assigned by the AP device according to the MAC address identity recognition key of the STA device;

wherein before the receiving, by the STA device, a first message sent from the AP device, the method further comprises:

sending, by the STA device, a second message to the AP device; wherein the second message comprises the MAC address identity recognition key and a public key of the STA device;

wherein the second message is sent through a second authentication frame; the second authentication frame comprises an identity key field, and the identity key field comprises a public key field and an address key field; the public key field is configured to indicate the public key of the STA device, and the address key field is configured to indicate the MAC address identity recognition key.

* * * * *